(12) United States Patent
Chang et al.

(10) Patent No.: US 10,725,268 B2
(45) Date of Patent: Jul. 28, 2020

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chen-Hung Tsai, Taichung (TW); Hung-Wen Lee, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 171 days.

(21) Appl. No.: 16/017,261

(22) Filed: Jun. 25, 2018

(65) Prior Publication Data

US 2019/0250370 A1   Aug. 15, 2019

(30) Foreign Application Priority Data

Feb. 13, 2018  (TW) .............................. 107105354 A

(51) Int. Cl.
   *G02B 13/00* (2006.01)
   *G02B 9/34* (2006.01)

(52) U.S. Cl.
   CPC ............. *G02B 13/004* (2013.01); *G02B 9/34* (2013.01)

(58) Field of Classification Search
   CPC ................................ G02B 13/004; G02B 9/34

USPC .......................................................... 359/715
   See application file for complete search history.

(56) References Cited

U.S. PATENT DOCUMENTS

2017/0017061 A1*  1/2017  Liu .................... G02B 13/06

FOREIGN PATENT DOCUMENTS

| TW | 201241501 A | 10/2012 |
| TW | M541018 U | 5/2017 |
| TW | M547110 U | 8/2017 |

* cited by examiner

*Primary Examiner* — Thomas K Pham
*Assistant Examiner* — Mitchell T Oestreich
(74) *Attorney, Agent, or Firm* — Wang Law Firm, Inc.

(57) ABSTRACT

An optical image capturing system is provided. In the order from an object side to an image side, the optical image capturing system includes a first lens, a second lens, a third lens, and a fourth lens. The first lens has positive refractive power and the object side thereof may be a convex surface. The second lens and the third lens both have refractive power and the object side and the image side of the second lens and the third lens are all aspheric. The fourth lens may have negative refractive power, the image side of the fourth lens may be a concave surface, and the object side and the image side thereof are both aspheric. When meeting some certain conditions, the optical image capturing system may have outstanding light-gathering ability and an adjustment ability about the optical path in order to elevate the image quality.

23 Claims, 18 Drawing Sheets

OPTICAL IMAGE CAPTURING SYSTEM

CROSS-REFERENCE TO RELATED APPLICATION

This application claims priority from Taiwan Patent Application No. 107105354, filed on Feb. 13, 2018, in the Taiwan Intellectual Property Office, the content of which is hereby incorporated by reference in its entirety for all purposes.

BACKGROUND OF THE INVENTION

1. Field of the Invention

The present invention relates to an optical image capturing system, and more particularly is about a minimized optical image capturing system which can be applied to electronic products.

2. Description of the Related Art

In recent years, with the rise of portable electronic devices having camera functionalities, the demand for an optical image capturing system has gradually been raised. The image sensing device of the ordinary photographing camera is commonly selected from a charge coupled device (CCD) or a complementary metal-oxide semiconductor sensor (CMOS Sensor). Also, as advanced semiconductor manufacturing technology enables the minimization of the pixel size of the image sensing device, the development of the optical image capturing system has gravitated towards the field of high pixels. Therefore, the requirement for high image quality has been rapidly increasing.

Conventional optical image capturing systems of portable electronic devices usually adopt a two lenses structure or three lenses structure as their main structure. However, since the pixel density of portable electronic devices has continuously increased, more end-users are demanding a large aperture for such as functionalities as glimmer and night view, or for a wide angle of view such as for selfies using the front camera. But the optical image capturing system with the large aperture often encounters the dilemma of plentiful aberration which results in the deterioration of peripheral image quality and difficulties about manufacturing, and the optical image capturing system with wide angle of view design encounters the dilemma of increased distortion rate in image formation. Conventional optical image capturing systems may not be sufficient to meet those advanced photography requirements.

Therefore, how to design an optical image capturing system capable of balancing the requirements for higher total pixel and higher image quality as well as the minimization of optical lenses by effectively increasing the amount of admitted light and the angle of view the optical image capturing system has become an important issue.

SUMMARY OF THE INVENTION

The aspect of embodiment of the present invention directs to an optical image capturing system which is able to use combination of refractive powers, convex and concave surfaces of four optical lenses (the convex or concave surface in the invention is the geometrical shape of an object side or an image side of each lens on an optical axis in principle) to increase the amount of light admitted into the optical image capturing system and angle of view of the optical image capturing system and to elevate the image quality and the total pixels of image, so that the optical image capturing system can be applied to the minimized electronic products.

The terms and their definition to the lens parameter in the embodiment of the present invention are shown as below for further reference.

The Lens Parameters Related to the Length or the Height

The maximum image height of the optical image capturing system may be expressed as HOI. The height of the optical image capturing system may be expressed as HOS. The distance from the object side of the first lens to the image side of the fourth lens of the optical image capturing system may be expressed as InTL. The distance from the image side of the fourth lens to the image plane of the optical image capturing system may be expressed as InB. The following equation is satisfied: InTL+InB=HOS. The distance from a fixed aperture (stop) to the image plane of the optical image capturing system may be expressed as InS. The distance from the first lens to the second lens of the optical image capturing system may be expressed as In12 (example). The thickness of the first lens of the optical image capturing system on the optical axis may be expressed as TP1 (example).

The Lens Parameters Related to the Material

A coefficient of dispersion of the first lens in the optical image capturing system may be expressed as NA1 (example). A refractive index of the first lens may be expressed as Nd1 (example).

The Lens Parameters Related to the Angle of View

An angle of view may be expressed as AF. A half angle of view may be expressed HAF. An angle of a chief ray may be expressed as MRA.

The Lens Parameter Related to Exit/Entrance Pupil

The entrance pupil diameter of the optical image capturing system may be expressed as HEP. A maximum effective half diameter (EHD) of any surface of a single lens refers to a perpendicular height between the optical axis and an intersection point where the incident ray at the maximum angle of view passing through the outmost edge of the entrance pupil intersects with the surface of the lens. For example, the maximum effective half diameter of the object side of the first lens may be expressed as EHD 11. The maximum effective half diameter of the image side of the first lens may be expressed as EHD 12. The maximum effective half diameter of the object side of the second lens may be expressed as EHD 21. The maximum effective half diameter of the image side of the second lens may be expressed as EHD 22. The maximum effective half diameters of any surfaces of other lenses in the optical image capturing system are expressed in a similar way.

The Lens Parameters Related to the Depth of the Lens

The horizontal distance parallel to the optical axis from a maximum effective half diameter position of the fourth lens to an intersection point where the object side of the fourth lens crosses the optical axis may be expressed as InRS41 (example). The horizontal distance parallel to the optical axis from a maximum effective half diameter position of the image side of the fourth lens to an intersection point where the image side of the fourth lens crosses the optical axis may be expressed as InRS42 (example).

The Lens Parameters Related to the Lens Shape

The critical point C is a point on the specific surface of the lens which is tangential to the tangential plane and perpendicular to the optical axis except that an intersection point on the specific surface of the lens which crosses the optical axis. In addition to the description above, the perpendicular distance between the critical point C31 on the object side of the third lens and the optical axis may be expressed as HVT31 (example). The perpendicular distance between a critical point C32 on the image side of the third lens and the optical axis may be expressed as HVT32 (example). The perpendicular distance between the critical point C41 on the object side of the fourth lens and the optical axis may be expressed as HVT41 (example). The perpendicular distance between a critical point C42 on the image side of the fourth lens and the optical axis may be expressed as HVT42 (example). The perpendicular distances between the critical point on the image side or the object side of other lenses and the optical axis are expressed in similar ways.

The inflection point on the object side of the fourth lens that is nearest to the optical axis may be expressed as IF411, wherein the sinkage value of the inflection point IF411 may be expressed as SGI411 (example). The sinkage value SGI411 is the horizontal distance parallel to the optical axis, which is from an intersection point where the object side of the fourth lens crosses the optical axis to the inflection point on the object side of the fourth lens that is first nearest to the optical axis. The perpendicular distance between the inflection point IF411 and the optical axis may be expressed as HIF411 (example). The inflection point on the image side of the fourth lens that is first nearest to the optical axis may be expressed as IF421, and the sinkage value of the inflection point IF421 may be expressed as SGI421 (example). The sinkage value SGI421 is the horizontal distance parallel to the optical axis, which is from the intersection point where the image side of the fourth lens crosses the optical axis to the inflection point on the image side of the fourth lens that is nearest to the optical axis. The perpendicular distance between the inflection point IF421 and the optical axis may be expressed as HIF421 (example).

The inflection point on the object side of the fourth lens that is the second nearest to the optical axis may be expressed as IF412 and the sinkage value of the inflection point IF412 may be expressed as SGI412 (example). The SGI412 is the horizontal distance parallel to the optical axis, which is from an intersection point where the object side of the fourth lens crosses the optical axis to the inflection point on the object side of the fourth lens that is the second nearest to the optical axis. The perpendicular distance between the inflection point IF412 and the optical axis may be expressed as HIF412 (example). The inflection point on the image side of the fourth lens that is the second nearest to the optical axis may be expressed as IF422 and the sinkage value of the inflection point IF422 may be expressed as SGI422 (example). The SGI422 is the horizontal distance parallel to the optical axis, which is from an intersection point where the image side of the fourth lens crosses the optical axis to the inflection point on the image side of the fourth lens that is second nearest to the optical axis. The perpendicular distance between the inflection point IF422 and the optical axis may be expressed as HIF422 (example).

The inflection point on the object side of the fourth lens that is the third nearest to the optical axis may be expressed as IF413 and the sinkage value of the inflection point IF413 may be expressed as SGI413 (example). The SGI413 is the horizontal distance parallel to the optical axis, which is from an intersection point where the object side of the fourth lens crosses the optical axis to the inflection point on the object side of the fourth lens that is the third nearest to the optical axis. The perpendicular distance between the inflection point IF413 and the optical axis may be expressed as HIF413 (example). The inflection point on the image side of the fourth lens that is the third nearest to the optical axis may be expressed as IF423 and the sinkage value of the inflection point IF423 may be expressed as SGI423 (example). The SGI423 is the horizontal distance parallel to the optical axis, which is from an intersection point where the image side of the fourth lens crosses the optical axis to the inflection point on the image side of the fourth lens that is the third nearest to the optical axis. The perpendicular distance between the inflection point IF423 and the optical axis may be expressed as HIF423 (example).

The inflection point on the object side of the fourth lens that is the fourth nearest to the optical axis may be expressed as IF414 and the sinkage value of the inflection point IF414 may be expressed as SGI414 (example). The SGI414 is the horizontal distance parallel to the optical axis, which is from an intersection point where the object side of the fourth lens crosses the optical axis to the inflection point on the object side of the fourth lens that is the fourth nearest to the optical axis. The perpendicular distance between the inflection point IF414 and the optical axis may be expressed as HIF414 (example). The inflection point on the image side of the fourth lens that is the fourth nearest to the optical axis may be expressed as IF424 and the sinkage value of the inflection point IF424 may be expressed as SGI424 (example). The SGI424 is the horizontal distance parallel to the optical axis, which is from an intersection point where the image side of the fourth lens crosses the optical axis to the inflection point on the image side of the fourth lens that is the fourth nearest to the optical axis. The perpendicular distance between the inflection point IF424 and the optical axis may be expressed as HIF424 (example).

The inflection points on the object side or the image side of the other lenses and the perpendicular distances between them and the optical axis, or the sinkage values thereof are expressed according to the regular patterns shown above.

The Lens Parameters Related to an Aberration

Optical distortion for image formation in the optical image capturing system may be expressed as ODT. TV distortion for image formation in the optical image capturing system may be expressed as TDT. Additionally, the degree of aberration offset within the range of 50% to 100% field of view of the formed image may be further defined. The offset of the spherical aberration may be expressed as DFS. The offset of the coma aberration may be expressed as DFC.

The characteristic diagram of modulation transfer function of the optical image capturing system is used for testing and evaluating the contrast ratio and the sharpness ratio of the image. The vertical coordinate axis of the characteristic diagram of modulation transfer function indicates a contrast transfer rate (with values from 0 to 1). The horizontal coordinate axis indicates a spatial frequency (cycles/mm; 1p/mm; line pairs per mm). Theoretically, an ideal image capturing system can clearly and distinctly show the line contrast of a photographed object. However, the values of the contrast transfer rate at the vertical coordinate axis are smaller than 1 in the actual optical image capturing system. In addition, it is generally more difficult to achieve a fine degree of recovery in the edge region of the image is than in the central region of the image. The contrast transfer rates (MTF values) with spatial frequencies of 55 cycles/mm at the optical axis, 0.3 field of view and 0.7 field of view of visible light spectrum on the image plane may be expressed as MTFE0, MTFE3 and MTFE7, respectively. The contrast transfer rates (MTF values) with spatial frequencies of 110 cycles/mm at the optical axis, 0.3 field of view, and 0.7 field of view of visible light spectrum on the image plane may be respectively expressed as MTFQ0, MTFQ3 and MTFQ7. The contrast transfer rates (MTF values) with spatial frequencies of 220 cycles/mm at the optical axis, 0.3 field of view, and 0.7 field of view of visible light spectrum on the image plane may be respectively expressed as MTFH0, MTFH3 and MTFH7. The contrast transfer rates (MTF values) with spatial frequencies of 440 cycles/mm at the optical axis, 0.3 field of view, and 0.7 field of view of visible light spectrum on the image plane may be respectively expressed as MTF0, MTF3 and MTF7. The three fields of view described above are representative to the center, the internal field of view and the external field of view of the lens. Therefore, the three fields of view described above may be used to evaluate whether the performance of the specific optical image capturing system is excellent. If the design of the optical image capturing system corresponds to a sensing device which pixel size is below and equal to 1.12 micrometers, the quarter spatial frequencies, the half spatial frequencies (half frequencies) and the full spatial frequencies (full frequencies) of the characteristic diagram of modulation transfer function are respectively at least 110 cycles/mm, 220 cycles/mm and 440 cycles/mm.

If an optical image capturing system needs to satisfy conditions with images of the infrared spectrum and the visible spectrum simultaneously, such as the requirements for night vision in low light, the used wavelength may be 850 nm or 800 nm. Because the main function is to recognize the shape of an object formed in a black-and-white environment, high resolution is unnecessary and thus the spatial frequency which is less than 110 cycles/mm may be selected to evaluate the performance of the specific optical image capturing system on the infrared light spectrum. When the foregoing wavelength 850 nm focuses on the image plane, the contrast transfer rates (MTF values) with a spatial frequency of 55 cycles/mm where the images are at the optical axis, 0.3 field of view and 0.7 field of view may be respectively expressed as MTFI0, MTFI3 and MTFI7. However, because the difference between the infrared wavelength of 850 nm or 800 nm and the general visible light wavelength is large, the optical image capturing system which not only has to focus on the visible light and the infrared light (dual-mode) but also has to achieve a certain function in the visible light and the infrared light respectively has a significant difficulty in design.

The invention provides an optical image capturing system, which is capable of focusing visible light and infrared light (dual-mode) simultaneously and achieving certain functions individually. An object side or an image side of the fourth lens may have inflection points, such that the incident angle from each field of view to the fourth lens can be adjusted effectively and the optical distortion and the TV distortion are amended as well. Besides, the surfaces of the fourth lens elevate the image quality.

The invention provides an optical image capturing system, in the order from an object side to an image side including a first lens, a second lens, a third lens and a fourth lens and an image plane. The first lens has refractive power. Focal lengths of the first lens through the fourth lens may be expressed as f1, f2, f3 and f4 respectively. The focal length of the optical image capturing system may be expressed as f. The entrance pupil diameter of the optical image capturing system may be expressed as HEP. The distance on an optical axis from an object side of the first to the image plane may be expressed as HOS. The distance on the optical axis from the object side of the first lens to the image side of the fourth lens may be expressed as InTL. The half maximum angle of view of the optical image capturing system may be expressed as HAF. Thicknesses of the first lens to the fourth lens at the height of ½ HEP parallel to the optical axis may be respectively expressed as ETP1, ETP2, ETP3 and ETP4. The sum of ETP1 to ETP4 described above may be expressed as SETP. Thicknesses of the first lens to the fourth lens on the optical axis may be respectively expressed as TP1, TP2, TP3 and TP4. The sum of TP1 to TP4 described above may be expressed as ETP. The following conditions are satisfied: $1.0 \leq f/HEP \leq 10.0$, $0 \deg < HAF \leq 150 \deg$ and $0.5 \leq SETP/\Sigma TP < 1$.

The invention also provides an optical image capturing system, in an order from an object side to an image side including a first lens, a second lens, a third lens, a fourth lens and an image plane. The first lens has refractive power. The second lens has refractive power. The third lens has refractive power. The fourth lens has refractive power. At least two lenses among the first lens to fourth lens respectively have at least one inflection point on at least one surface thereof. At least one lens of the second lens to fourth lens has positive refractive power. Focal lengths of the first lens through fourth lens may be expressed as f1, f2, f3 and f4 respectively. The focal length of the optical image capturing system may be expressed as f. The entrance pupil diameter of the optical image capturing system may be expressed as HEP. The distance on the optical axis from an object side of the first lens to the image plane may be expressed as HOS. The distance on the optical axis from the object side of the first lens to the image side of the fourth lens may be expressed as InTL. The half maximum angle of view of the optical image capturing system may be expressed as HAF. The horizontal distance parallel to the optical axis from a first coordinate point on the object side of the first lens at height of ½ HEP to the image plane may be expressed as ETL. The horizontal distance parallel to the optical axis from a first coordinate point on the object side of the first lens at height of ½ HEP to a second coordinate point on the image side of the fourth lens at height of ½ HEP may be expressed as EIN. The following conditions are satisfied: $1.0 \leq f/HEP \leq 10$, $0 \deg < HAF \leq 150 \deg$ and $0.2 \leq EIN/ETL < 1$.

The invention further provides an optical image capturing system, in an order from an object side to an image side including a first lens, a second lens, a third lens, a fourth lens and an image plane. At least one of the object side and the image side of the fourth lens has at least one inflection point, wherein there are four lenses having refractive power in the optical image capturing system. The first lens has negative refractive power. The second lens has refractive power. The third lens has refractive power. The fourth lens has refractive power. Focal lengths of the first lens through the fourth lens may be expressed as f1, f2, f3 and f4 respectively. The focal length of the optical image capturing system may be expressed as f. The entrance pupil diameter of the optical image capturing system may be expressed as HEP. The distance on the optical axis from an object side of the first lens to the image plane may be expressed as HOS. The distance on the optical axis from the object side of the first lens to the image side of the fourth lens may be expressed as InTL. The half maximum angle of view of the optical image capturing system may be expressed as HAF. The horizontal distance parallel to the optical axis from a first coordinate point on the object side of the first lens at height of ½ HEP to the image plane may be expressed as ETL. The horizontal distance parallel to the optical axis from a first coordinate point on the object side of the first lens at height of ½ HEP to a second coordinate point on the image side of the fourth lens at height of ½ HEP may be expressed as EIN. The following conditions are satisfied: $1.0 \leq f/HEP \leq 10$, $0 \deg < HAF \leq 150 \deg$ and $0.2 \leq EIN/ETL < 1$.

The thickness of a single lens at a height of ½ entrance pupil diameter (HEP) particularly affects the corrected aberration of common area of each field of view of light and the capability of correcting the optical path difference between each field of view of light in the scope of ½ entrance pupil diameter (HEP). The capability of aberration correction is enhanced if the thickness of the lens becomes greater, but the difficulty for manufacturing is also increased at the same time. Therefore, the thickness of a single lens at the height of ½ entrance pupil diameter (HEP) needs to be controlled, and the ratio relationship (ETP/TP) between the thickness (ETP) of the lens at a height of ½ entrance pupil diameter (HEP) and the thickness (TP) of the lens on the optical axis needs to be controlled in particular. For example, the thickness of the first lens at a height of ½ entrance pupil diameter (HEP) may be expressed as ETP1. The thickness of the second lens at a height of ½ entrance pupil diameter (HEP) may be expressed as ETP2. The thicknesses of other lenses at a height of ½ entrance pupil diameter (HEP) in the optical image capturing system are expressed in a similar way. The sum of ETP1 to ETP6 described above may be expressed as SETP. The embodiments of the present invention may satisfy the following relation: $0.3 \leq SETP/EIN<1$.

In order to achieve a balance between enhancing the capability of aberration correction and reducing the difficulty for manufacturing, the ratio relationship (ETP/TP) between the thickness (ETP) of the lens at the height of ½ entrance pupil diameter (HEP) and the thickness (TP) of the lens on the optical axis needs to be controlled in particular. For example, the thickness of the first lens at the height of ½ entrance pupil diameter (HEP) may be expressed as ETP1. The thickness of the first lens on the optical axis may be expressed as TP1. The ratio between ETP1 and TP1 may be expressed as ETP1/TP1. The thickness of the second lens at the height of ½ entrance pupil diameter (HEP) may be expressed as ETP2. The thickness of the second lens on the optical axis may be expressed as TP2. The ratio between ETP2 and TP2 may be expressed as ETP2/TP2. The ratio relationships between the thicknesses of other lenses at height of ½ entrance pupil diameter (HEP) and the thicknesses (TP) of the lens on the optical axis lens in the optical image capturing system are expressed in a similar way. The embodiments of the present invention may satisfy the following relation: $0 \leq ETP/TP \leq 5$.

The horizontal distance between two adjacent lenses at height of ½ entrance pupil diameter (HEP) may be expressed as ED. The horizontal distance (ED) described above is parallel to the optical axis of the optical image capturing system and particularly affects the corrected aberration of common area of each field of view of light and the capability of correcting the optical path difference between each field of view of light at the position of ½ entrance pupil diameter (HEP). The capability of aberration correction may be enhanced if the horizontal distance becomes greater, but the difficulty for manufacturing is also increased and the degree of 'miniaturization' to the length of the optical image capturing system is restricted. Therefore, the horizontal distance (ED) between two specific adjacent lens at the height of ½ entrance pupil diameter (HEP) must be controlled.

In order to achieve a balance between enhancing the capability of correcting aberration and reducing the difficulty for 'minimization' to the length of the optical image capturing system, the proportional relation (ED/IN) of the horizontal distance (ED) between the two adjacent lenses at height of ½ entrance pupil diameter (HEP) to the horizontal distance (IN) between the two adjacent lenses on the optical axis particularly needs to be controlled. For example, the horizontal distance between the first lens and the second lens at height of ½ entrance pupil diameter (HEP) may be expressed as ED12. The horizontal distance on the optical axis between the first lens and the second lens may be expressed as IN12. The ratio between ED12 and IN12 may be expressed as ED12/IN12. The horizontal distance between the second lens and the third lens at height of ½ entrance pupil diameter (HEP) may be expressed as ED23. The horizontal distance on the optical axis between the second lens and the third lens may be expressed as IN23. The ratio between ED23 and IN23 may be expressed as ED23/IN23. The proportional relations of the horizontal distances between other two adjacent lenses in the optical image capturing system at height of ½ entrance pupil diameter (HEP) to the horizontal distances on the optical axis between the two adjacent lenses are expressed in a similar way.

The horizontal distance parallel to the optical axis from a coordinate point on the image side of the fourth lens at height ½ HEP to the image plane may be expressed as EBL. The horizontal distance parallel to the optical axis from an intersection point where the image side of the fourth lens crosses the optical axis to the image plane may be expressed as BL. The embodiments of the present invention are able to achieve a balance between enhancing the capability of aberration correction and reserving space to accommodate other optical elements and the following condition may be satisfied: $0.1 \leq EBL/BL \leq 1.5$.

The optical image capturing system may further include a light filtering element. The light filtering element is located between the fourth lens and the image plane. The distance parallel to the optical axis from a coordinate point on the image side of the fourth lens at height of ½ HEP to the light filtering element may be expressed as EIR. The distance parallel to the optical axis from an intersection point where the image side of the fourth lens crosses the optical axis to the light filtering element may be expressed as PIR. The embodiments of the present invention may satisfy the following condition: $0.1 \leq EIR/PIR \leq 1.1$.

The optical image capturing system described above may be used to collocate with the image sensing device whose diagonal length is shorter than 1/1.2 inches to form an image. Preferably, the size of the image sensing device is 1/2.3 inches. The pixel size of the image sensing device is smaller than 1.4 micrometers (μm). Preferably, the pixel size of the image sensing device is smaller than 1.12 micrometers (μm). The best pixel size of the image sensing device is smaller than 0.9 micrometers (μm). Furthermore, the optical image capturing system is applicable to the image sensing device with an aspect ratio of 16:9.

The optical image capturing system described above is applicable to the demand of video recording with more than millions or tens of millions of pixels (e.g. 4K and 2K videos or the so-called UHD and QHD) and is endowed with a good image quality.

The height of optical image capturing system (HOS) may be reduced to achieve the minimization of the optical image capturing system when the absolute value of f1 is larger than f4 ($|f1|>f4$).

When the relationship $|f2|+|f3|>|f1|+|f4|$ is satisfied, at least one of the second lens through third lens may have weak positive refractive power or weak negative refractive power. The weak refractive power indicates that an absolute value of the focal length of a specific lens is greater than 10. When at least one of the second lens through the third lens has the weak positive refractive power, the positive refractive power of the first lens can be shared effectively, such that the unnecessary aberration will not appear too early. On the contrary, when at least one of the second lens and third lens has the weak negative refractive power, the aberration of the optical image capturing system can be corrected and fine-tuned.

The fourth lens may have negative refractive power, and the image side surface of the fourth lens may be a concave surface. Hereby, this configuration is beneficial to shorten the back focal length of the optical image capturing system in order to keep the miniaturization of the optical image capturing system. Moreover, at least one surface of the sixth lens may possess at least one inflection point which is capable of effectively reducing the incident angle of the off-axis rays and may further correct the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DESCRIPTION OF THE PREFERRED EMBODIMENTS

Figure 1A:
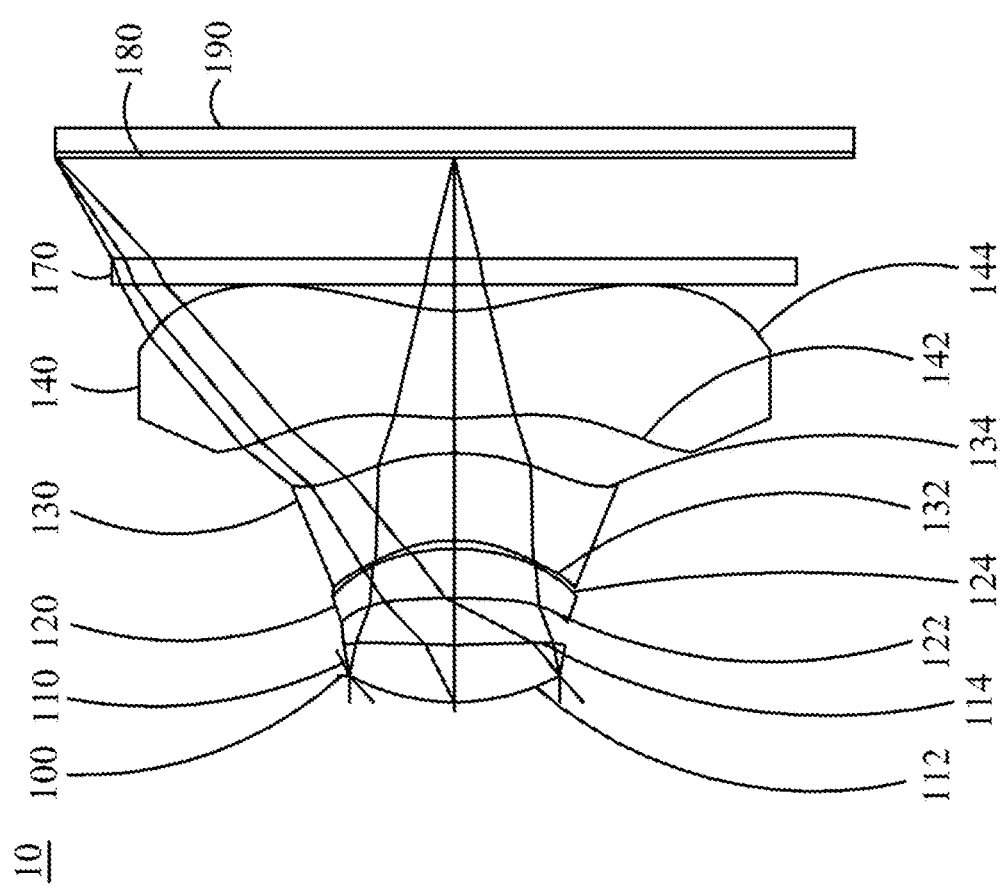
FIG. 1A is a schematic view of the optical image capturing system according to the first embodiment of the present invention.

An optical image capturing system, in the order from an object side to an image side, includes a first lens, a second lens, a third lens and a fourth lens with refractive power and an image plane. The optical image capturing system may further include an image sensing device which is disposed on the image plane.

The optical image capturing system may use three sets of operation wavelengths which are 486.1 nm, 587.5 nm and 656.2 nm, respectively, wherein 587.5 nm serves as the primary reference wavelength and the primary reference wavelength to obtain the technical features of the optical image capturing system. The optical image capturing system may also use five sets of wavelengths which are 470 nm, 510 nm, 555 nm, 610 nm and 650 nm, respectively, wherein 555 nm serves as the primary reference wavelength and the primary reference wavelength to obtain the technical features of the optical image capturing system.

The ratio of the focal length f of the optical image capturing system to the focal length fp of each lens with positive refractive power may be expressed as PPR. The ratio of the focal length f of the optical image capturing system to the focal length fn of each lens with negative refractive power may be expressed as NPR. The sum of the PPR of all lenses with positive refractive powers may be expressed as ΣPPR. The sum of the NPR of all lenses with negative refractive powers may be expressed as ΣNPR. The total refractive power and the total length of the optical image capturing system can be controlled easily when meeting following condition: 0.5≤ΣPPR/|ΣNPR|≤4.5. Preferably, the following condition may be satisfied: 1≤ΣPPR/|ΣNPR|≤3.5.

The height of the optical image capturing system may be expressed as HOS. When the ratio of HOS/f approaches 1, this configuration would be beneficial for manufacturing the miniaturized optical image capturing system which is capable of forming the ultra-high pixel image.

The sum of the focal length fp of each lens with positive refractive power may be expressed as ΣPP. The sum of the focal length fn of each lens with negative refractive power may be expressed as ΣNP. In one embodiment of the optical image capturing system of the present invention, the following conditions are satisfied: 0<ΣPP≤200 and f1/ΣPP≤0.85. Preferably, the following relations may be satisfied: 0<ΣPP≤150 and 0.01≤f1/ΣPP≤0.7. Hereby, this configuration is beneficial for controlling the focus ability of the optical image capturing system and distributes the positive refractive power of the optical image capturing system appropriately, so as to suppress the premature formation of noticeable aberration.

The first lens may have positive refractive power and the object side of the first lens may be a convex surface. Hereby, adjusting magnitude of the positive refractive power of the first lens properly is helpful to shorten the total length of the optical image capturing system.

The second lens may have negative refractive power. Hereby, this configuration may amend the aberration generated by the first lens.

The third lens may have positive refractive power. Hereby, this configuration may share the positive refractive power of the first lens.

The fourth lens may have negative refractive power and the image side of the fourth lens may be a concave surface. Besides this, at least one surface of the fourth lens may have at least one inflection point. This configuration may suppress incident angles of off-axis rays and further may amend the aberration of off-axis rays. Preferably, the object side and the image side of the fourth lens both possess at least one inflection point.

The optical image capturing system may further include an image sensing device which is disposed on an image plane. The half diagonal of an effective detection field of the image sensing device (imaging height or the maximum image height of the optical image capturing system) may be expressed as HOI. The distance on the optical axis from the object side of the first lens to the image plane may be expressed as HOS. The following conditions are satisfied: HOS/HOI≤3 and 0.5≤HOS/f≤3.0. Preferably, the following conditions may be satisfied: 1≤HOS/HOI≤2.5 and 1≤HOS/f≤2. Hereby, the characteristic of miniaturization for the optical image capturing system can be maintained effectively, so as to be collocated with lightweight portable electronic devices.

In addition, in the optical image capturing system of the invention, according to different requirements, at least one aperture may be arranged for reducing stray light and improving the image quality.

In the optical image capturing system of the invention, the aperture may be a front or middle aperture. Wherein, the front aperture is the aperture disposed between a photographed object and the first lens while the middle aperture is the aperture disposed between the first lens and the image plane. In the case that the aperture is the front aperture, this configuration can make the optical image capturing system generate a longer distance between the exit pupil and the image plane, such that the optical image capturing system can accommodate more optical elements and the efficiency of the image sensing device in receiving image can be increased. In the case that the aperture is the middle aperture, this configuration can expand the angle of view of the optical image capturing system, such that the optical image capturing system has the advantage of the camera lens with wide angle. The distance from the foregoing aperture to the image plane may be expressed as InS. The following condition is satisfied: 0.5≤InS/HOS≤1.1. Preferably, the following condition may be satisfied: 0.8≤InS/HOS≤1. Therefore, the optical image capturing system can be kept miniaturized and have a feature of wide angle of view.

In the optical image capturing system of the invention, the distance from the object side of the first lens to the image side of the fourth lens may be expressed as InTL. The sum of thicknesses of all lenses with refractive power on the optical axis may be expressed as ETP. The following condition is satisfied: 0.45≤ΣTP/InTL≤0.95. Preferably, the following condition may be satisfied: 0.6≤ΣTP/InTL≤0.9. Hence, the contrast ratio of the image in the optical image capturing system and the yield rate about manufacturing the lenses may be achieved at the same time, and an appropriate back focal length may be provided so as to accommodate other optical elements in the optical image capturing system.

The curvature radius of the object side of the first lens may be expressed as R1. The curvature radius of the image side of the first lens may be expressed as R2. The following condition is satisfied: 0.01≤|R1/R2|≤10.5. Hereby, the first lens may have a suitable magnitude of positive refractive power, so as to avoid the longitudinal spherical aberration from increasing too much. Preferably, the following condition may be satisfied: 0.01≤|R1/R2|≤0.4.

The curvature radius of the object side of the fourth lens may be expressed as R9. The curvature radius of the image side of the fourth lens may be expressed as R10. The following condition is satisfied: −200<(R7−R8)/(R7+R8)<30. Hereby, the configuration is beneficial for correcting the astigmatism generated by the optical image capturing system.

The distance on the optical axis between the first lens and the second lens may be expressed as IN12. The following condition is satisfied: 0<IN12/f≤0.25. Preferably, the following condition may be satisfied: 0.01≤IN12/f≤0.20. Hereby, the configuration is beneficial for improving the chromatic aberration of the lens so as to elevate the performance thereof.

The distance on the optical axis between the second lens and the third lens may be expressed as IN23. The following condition is satisfied: 0<IN23/f≤0.25. Preferably, the following condition may be satisfied: 0.01≤IN12/f≤0.20. Hereby, the configuration is beneficial for improving the performance of the lens.

The distance on the optical axis between the third lens and the fourth lens may be expressed as IN34. The following condition is satisfied: 0<IN34/f≤0.25. Preferably, the following condition may be satisfied: 0.001≤IN34/f≤0.20. Hereby, the configuration is beneficial for improving the performance of the lens.

The thicknesses of the first lens and the second lens on the optical axis may be expressed as TP1 and TP2, respectively. The following condition is satisfied: 1≤(TP1+IN12)/TP2≤10. Hereby, the configuration is helpful to control the sensitivity produced by the optical image capturing system and improve the performance of the optical image capturing system.

The thicknesses of the third lens and the fourth lens on the optical axis may be expressed as TP3 and TP4, respectively, and a distance between the aforementioned two lenses on the optical axis may be expressed as IN34. The following condition is satisfied: 0.2≤(TP4+IN34)/TP4≤3. Hereby, the configuration is helpful to control the sensitivity produced by the optical image capturing system and decrease the total height of the optical image capturing system.

The distance on the optical axis between the second lens and the third lens may be expressed as IN23. The total sum of distances on the optical axis from the first lens to the fourth lens may be expressed as ΣTP. The following condition is satisfied: 0.01≤IN23/(TP2+IN23+TP3)≤0.5. Preferably, the following condition may be satisfied: 0.05≤IN23/(TP2+IN23+TP3)≤0.4. Hereby, this configuration is helpful to slightly correct the aberration of the propagating process of the incident light layer by layer, and decrease the total height of the optical image capturing system.

In the optical image capturing system of the present invention, the horizontal distance parallel to the optical axis from a position of maximum effective half diameter on the object side 142 of the fourth lens to an intersection point where the object side 142 of the fourth lens crosses the optical axis may be expressed as InRS41 (if the horizontal distance is toward the image side of the fourth lens, InRS41 is a positive value; if the horizontal distance is toward the object side of the fourth lens, InRS41 is a negative value). The horizontal distance parallel to the optical axis from a position of maximum effective half diameter on the image side 144 of the fourth lens to an intersection point where the image side 144 of the fourth lens crosses the optical axis may be expressed as InRS42. The thickness of the fourth lens 140 on the optical axis may be expressed as TP4. The following conditions are satisfied: −1 mm≤InRS41≤1 mm, −1 mm≤InRS42≤1 mm, 1 mm≤|InRS41|+|InRS42|≤2 mm, 0.01≤|InRS41|/TP4≤10 and 0.01≤|InRS42|/TP4≤10. Hence, the configuration may control the position of the maximum effective half diameter between both surfaces of the fourth lens, and facilitate the aberration correction of the peripheral field of view of the optical image capturing system and effectively maintain the characteristics of miniaturization for the optical image capturing system.

In the optical image capturing system of the present invention, the horizontal distance parallel to the optical axis from an inflection point on the object side of the fourth lens that is the first nearest to the optical axis to an intersection point where the object side of the fourth lens crosses the optical axis of may be expressed as SGI411. The horizontal distance parallel to the optical axis from an inflection point on the image side of the fourth lens that is the first nearest to the optical axis to an intersection point where the image side of the fourth lens crosses the optical axis may be expressed as SGI421. The following conditions are satisfied: 0<SGI411/(SGI411+TP4)≤0.9 and 0<SGI421/(SGI421+TP4)≤0.9. Preferably, the following conditions may be satisfied: 0.01<SGI411/(SGI411+TP4)≤0.7 and 0.01<SGI421/(SGI421+TP4)≤0.7.

The horizontal distance parallel to the optical axis from the inflection point on the object side of the fourth lens that is the second nearest to the optical axis to an intersection point where the object side of the fourth lens crosses the optical axis may be expressed as SGI412. The horizontal distance parallel to the optical axis from the inflection point on the image side of the fourth lens that is the second nearest to the optical axis to an intersection point where the image side of the fourth lens crosses the optical axis may be expressed as SGI422. The following conditions are satisfied: 0<SGI412/(SGI412+TP4)≤0.9 and 0<SGI422/(SGI422+TP4)≤0.9. Preferably, the following conditions may be satisfied: 0.1≤SGI412/(SGI412+TP4)≤0.8 and 0.1≤SGI422/(SGI422+TP4)≤0.8.

The perpendicular distance between the inflection point on the object side of the fourth lens that is the first nearest to the optical axis and the optical axis may be expressed as HIF411. The perpendicular distance between the inflection point on the image side of the fourth lens that is the first nearest to the optical axis and an intersection point where the image side of the fourth lens crosses the optical axis may be expressed as HIF421. The following conditions are satisfied: 0.01≤HIF411/HOI≤0.9 and 0.01≤HIF421/HOI≤0.9. Preferably, the following conditions may be satisfied: 0.09≤HIF411/HOI≤0.5 and 0.09≤HIF421/HOI≤0.5.

The perpendicular distance between the inflection point on the object side of the fourth lens that is the second nearest to the optical axis and the optical axis may be expressed as HIF412. The perpendicular distance between an intersection point where the image side of the fourth lens crosses the optical axis and the inflection point on the image side of the fourth lens that is the second nearest to the optical axis may be expressed as HIF422. The following conditions are satisfied: 0.01≤HIF412/HOI≤0.9 and 0.01≤HIF422/HOI≤0.9. Preferably, the following conditions may be satisfied: 0.09≤HIF412/HOI≤0.8 and 0.09≤HIF422/HOI≤0.8.

The perpendicular distance between the inflection point on the object side of the fourth lens that is the third nearest to the optical axis and the optical axis may be expressed as HIF413. The perpendicular distance between an intersection point where the image side of the fourth lens crosses the optical axis and the inflection point on the image side of the fourth lens that is the third nearest to the optical axis may be expressed as HIF423. The following conditions are satisfied: 0.001 mm≤|HIF413|≤5 mm and 0.001 mm≤|HIF423|≤5 mm; preferably, the following conditions may be satisfied: 0.1 mm≤|HIF423|≤3.5 mm and 0.1 mm≤|HIF413|≤3.5 mm.

The perpendicular distance between the inflection point on the object side of the fourth lens that is the fourth nearest to the optical axis and the optical axis may be expressed as HIF414. The perpendicular distance between an intersection point where the image side of the fourth lens crosses the optical axis and the inflection point on the image side of the fourth lens that is the fourth nearest to the optical axis may be expressed as HIF424. The following conditions are satisfied: 0.001 mm≤|HIF414|≤5 mm and 0.001 mm≤|HIF424|≤5 mm; preferably, the following conditions may be satisfied: 0.1 mm≤|HIF424|≤3.5 mm and 0.1 mm≤|HIF414|≤3.5 mm.

In one embodiment of the optical image capturing system of the present invention, arranging the lens with high coefficient of dispersion and low coefficient of dispersion in a staggered manner can be helpful to correct the chromatic aberration of the optical image capturing system.

The equation for the aforementioned aspheric surface is:

$$z=ch^2/[1+[1-(k+1)c^2h^2]^{0.5}]+A_4h^4+A_6h^6+A_8h^8+A_{10}h^{10}+A_{12}h^{12}+A_{14}h^{14}+A_{16}h^{16}+A_{18}h^{18}+A_{20}h^{20}+\ldots \quad (1),$$

where z is a position value of the position along the optical axis and at the height h which reference to the surface apex; k is the conic coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

In the optical image capturing system provided by the present invention, the lens may be made of glass or plastic. If the lens is made of plastic, it can reduce the manufacturing cost as well as the weight of the lens effectively. If lens is made of glass, it can control the heat effect and increase the design space of the configuration of the lens with refractive powers in the optical image capturing system. Besides, the object side and the image side of the first lens through fourth lens in the optical image capturing system may be aspheric, which can gain more control variables and even reduce the number of the used lenses in contrast to traditional glass lenses in addition to the use of reducing the aberration. Thus, the total height of the optical image capturing system can be reduced effectively.

In addition, in the optical image capturing system provided by the present invention, if the surface of lens is a convex surface, it means that the surface of lens adjacent to the optical axis is a convex surface. If the surface of lens is a concave surface, it means that the surface of lens adjacent to the optical axis is a concave surface.

Besides this, in the optical image capturing system of the present invention, according to different requirements, at least one aperture may be arranged for reducing stray light and the configuration is helpful to improve the image quality.

The optical image capturing system of the present invention can be applied to the optical image capturing system with automatic focus based on the demand and have the characters of the good aberration correction and the high image quality. Thereby, the optical image capturing system expands the application aspect.

The optical image capturing system of the present invention may further include a driving module according to requirements, wherein the driving module may be coupled to the lenses and enables movements of the lenses. The aforementioned driving module may be the voice coil motor (VCM) which is used to move the lenses to focus, or may be the optical image stabilization (OIS) which is applied to reduce the frequency which lead to the out focus due to the vibration of the camera lens in the shooting process.

At least one lens among the first lens, the second lens, the third lens and the fourth lens of the optical image capturing system of the present invention may be a light filtering element which has a wavelength less than 500 nm according to the actual requirements. The light filtering element may be made by coating a film on at least one surface of that lens with certain filtering function, or forming that lens with material that can filter light with short wavelength.

The image plane of the optical image capturing system of the present invention may be a plane or a curved surface based on the design requirement. When the image plane is a curved surface (e.g. a spherical surface with curvature radius), it is helpful to decrease the required incident angle to focus rays on the image plane. In addition to aiding the miniaturization of the length of the optical image capturing system (TTL), this configuration is helpful to elevate the relative illumination at the same time.

According to the above embodiments, the specific embodiments with figures are presented in detail as below.

The First Embodiment

Figure 1B:
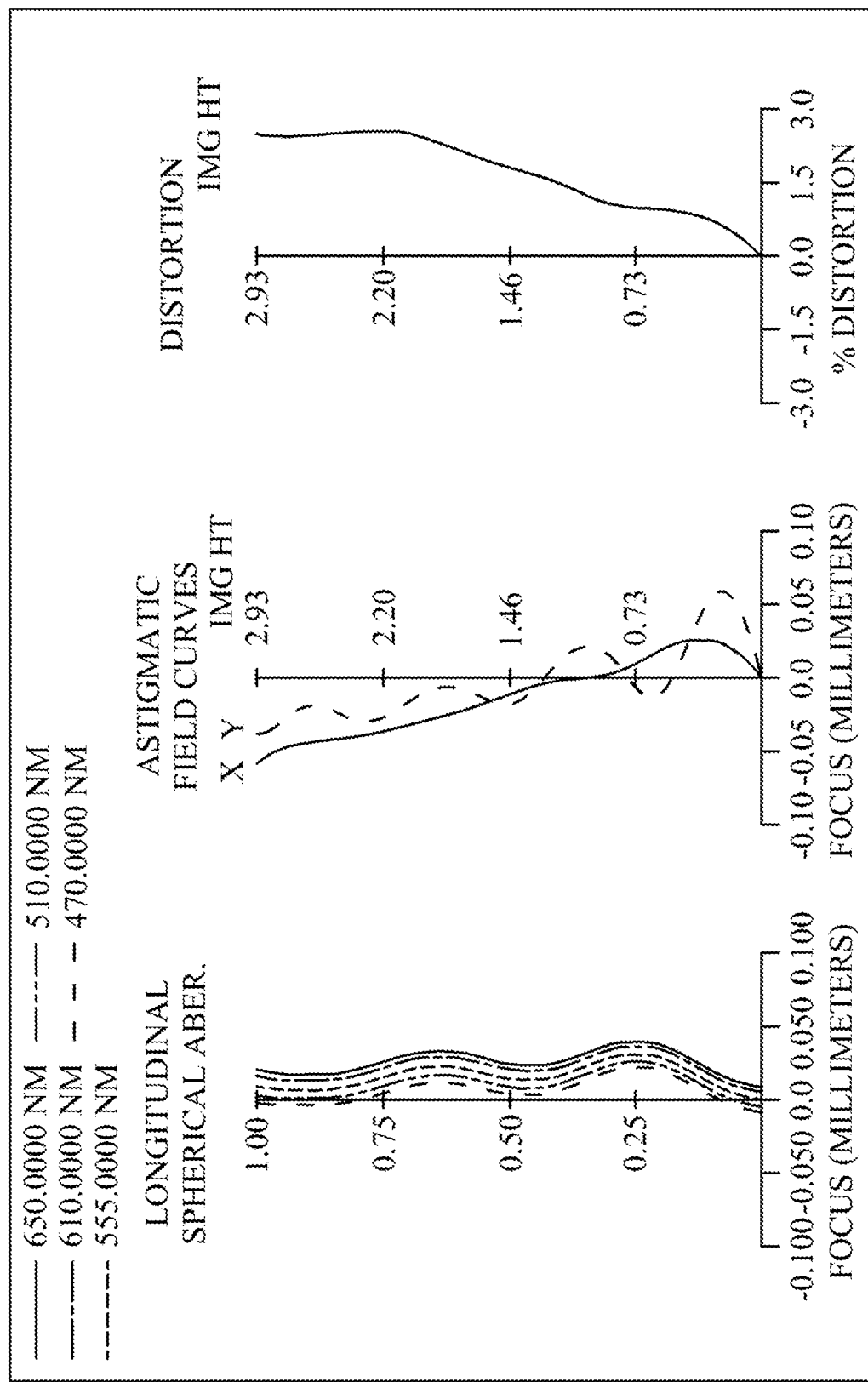
FIG. 1B shows the longitudinal spherical aberration curves, the astigmatic field curves, and the optical distortion of the optical image capturing system in the order from left to right according to the first embodiment of the present invention.
Figure 1C:
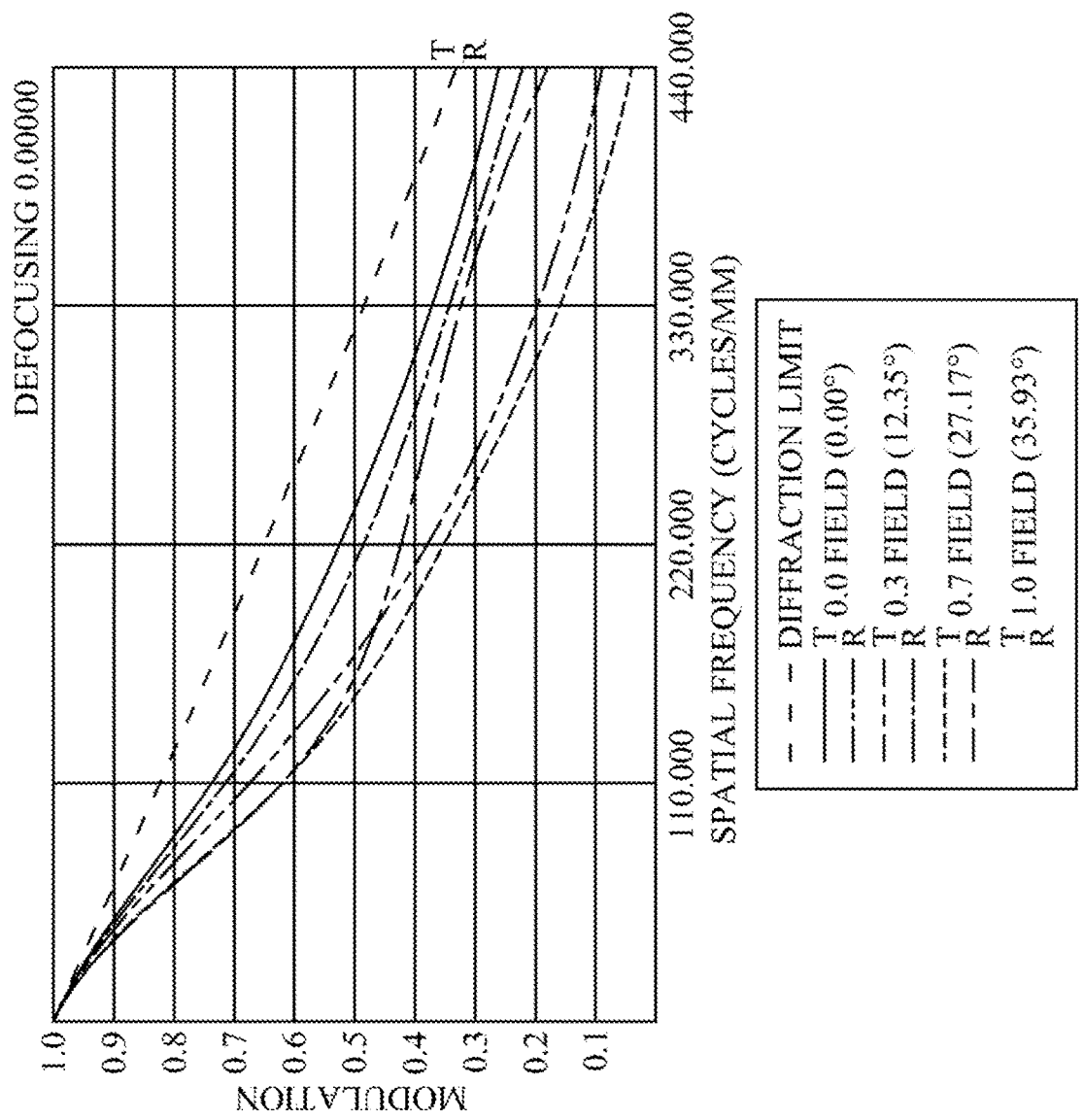
FIG. 1C is a characteristic diagram of modulation transfer of visible light spectrum for the optical image capturing system according to the first embodiment of the present invention.

Please refer to FIG. 1A to FIG. 1C. FIG. 1A is a schematic view of the optical image capturing system according to the first embodiment of the present invention. FIG. 1B shows the longitudinal spherical aberration curves, astigmatic field curves, and an optical distortion of the optical image capturing system in the order from left to right according to the first embodiment of the present invention. FIG. 1C is a characteristic diagram of modulation transfer of visible light for the optical image capturing system of the first embodiment of the present invention.

As shown in FIG. 1A, in the order from an object side to an image side, the optical image capturing system 10 includes an aperture 100, a first lens 110, a second lens 120, a third lens 130, a fourth lens 140, an IR-bandstop filter 170, an image plane 180 and an image sensing device 190.

The first lens 110 has positive refractive power and is made of plastic. The object side 112 of first lens 110 is a convex surface and the image side 114 of the first lens 110 is a concave surface, and the object side 112 and the image side 114 of the first lens 110 are aspheric. The object side 112 and the image side 114 of the first lens 110 both have one inflection point. The thickness of the first lens 110 on the optical axis may be expressed as TP1. The thickness of the first lens 110 at a height of ½ entrance pupil diameter (HEP) may be expressed as ETP1.

The horizontal distance parallel to the optical axis from an inflection point on the object side 112 of the first lens 110 that is the first nearest to the optical axis to an intersection point where the object side 112 of the first lens 110 crosses the optical axis may be expressed as SGI111. The horizontal distance parallel to the optical axis from an inflection point on the image side 114 of the first lens 110 that is nearest to the optical axis to an intersection point where the image side 114 of the first lens 110 crosses the optical axis may be expressed as SGI1121. The following conditions are satisfied: SGI111=0.2008 mm, SGI121=0.0113 mm, |SGI111|/(|SGI111|+TP1)=0.3018 and |SGI121|/(|SGI121|+TP1)=0.0238.

The distance perpendicular to the optical axis from the inflection point on the object side 112 of the first lens 110 that is nearest to the optical axis to an intersection point where the object side 112 of the first lens 110 crosses the optical axis may be expressed as HIF111. The distance perpendicular to the optical axis from the inflection point on the image side of the first lens that is nearest to the optical axis to an intersection point where the image side 114 of the first lens 110 crosses the optical axis may be expressed as HIF121. The following conditions are satisfied: HIF111=0.7488 mm, HIF121=0.4451 mm, HIF111/HOI=0.2552 and HIF121/HOI=0.1517.

The second lens 120 has positive refractive power and is made of plastic. The object side 122 of the second lens 120 is a concave surface and the image side surface 124 of the second lens 120 is a convex surface, and the object side 122 and the image side 124 of the second lens 120 are aspheric. The object side 122 of the second lens 120 has one inflection point. The thickness of the second lens 120 on the optical axis may be expressed as TP2. The thickness of the second lens 120 at a height of ½ entrance pupil diameter (HEP) may be expressed as ETP2.

The horizontal distance parallel to the optical axis from an inflection point on the object side 122 of the second lens 120 that is the first nearest to the optical axis to an intersection point where the object side 122 of the second lens 120 crosses optical axis may be expressed as SGI211. The horizontal distance parallel to the optical axis from an inflection point on the image side 124 of the second lens 120 that is the first nearest to the optical axis to an intersection point where the image side 124 of the second lens 120 crosses the optical axis may be expressed as SGI221. The following conditions are satisfied: SGI211=−0.1791 mm and |SGI211|/(|SGI211|+TP2)=0.3109.

The distance perpendicular to the optical axis from the inflection point on the object side 122 of the second lens 120 that is nearest to the optical axis to an intersection point where the object side 122 of the second lens 120 crosses the optical axis may be expressed as HIF211. The distance perpendicular to the optical axis from the inflection point on the image side 124 of the second lens 120 that is nearest to the optical axis to an intersection point where the image side 124 of the second lens 120 crosses the optical axis may be expressed as HIF221. The following conditions are satisfied: HIF211=0.8147 mm and HIF211/HOI=0.2777.

The third lens 130 has negative refractive power and is made of plastic. The object side 132 of the third lens 130 is a concave surface and the image side 134 of the third lens 130 is a convex surface, and the object side 132 and the image side 134 of the third lens 130 are both aspheric. The image side 134 of the third lens 130 has one inflection point. The thickness of the third lens 130 on the optical axis may be expressed as TP3. The thickness of the third lens 130 at a height of ½ entrance pupil diameter (HEP) may be expressed as ETP3.

The horizontal distance parallel to the optical axis from an inflection point on the object side 132 of the third lens 130 that is the first nearest to the optical axis to an intersection point where the object side 132 of the third lens 130 crosses the optical axis may be expressed as SGI311. The horizontal distance parallel to the optical axis from an inflection point on the image side 134 of the third lens 130 that is the first nearest to the optical axis to an intersection point where the image side of the third lens crosses the optical axis may be expressed as SGI321. The following conditions are satisfied: SGI321=−0.1647 mm and |SGI321|/(|SGI321|+TP3) =0.1884.

The distance perpendicular to the optical axis from the inflection point on the object side 132 of the third lens 130 that is the first nearest to the optical axis to the optical axis may be expressed as HIF311. The distance perpendicular to the optical axis from the inflection point on the image side 134 of the third lens 130 that is the first nearest to the optical axis to an intersection point where the image side 134 of the third lens 130 crosses the optical axis may be expressed as HIF321. The following conditions are satisfied: HIF321=0.7269 mm and HIF321/HOI=0.2477.

The fourth lens 140 has negative refractive power and is made of plastic. An object side 142 of the fourth lens 140 is a convex surface and an image side 144 of the fourth lens 140 is a concave surface, and the object side 142 and the image side 144 of the fourth lens 140 are both aspheric. The object side 142 of the fourth lens 140 has two inflection points, and the image side 144 of the fourth lens 140 has one inflection point. The thickness of the fourth lens 140 on the optical axis may be expressed as TP4. The thickness of the fourth lens 140 at a height of ½ entrance pupil diameter (HEP) may be expressed as ETP4.

The horizontal distance parallel to the optical axis from an inflection point on the object side 142 of the fourth lens 140 that is the first nearest to the optical axis to an intersection point where the object side 142 of the fourth lens 140 crosses the optical axis may be expressed as SGI411. The horizontal distance parallel to the optical axis from an inflection point on the image side 144 of the fourth lens 140 that is the first nearest to the optical axis to an intersection point where the image side 144 of the fourth lens 140 crosses the optical axis may be expressed as SGI421. The following conditions are satisfied: SGI411=0.0137 mm, SGI421=0.0922 mm, |SGI411|/(|SGI411|+TP4)=0.0155 and |SGI421|/ (|SGI421|+TP4)=0.0956.

The horizontal distance parallel to the optical axis from an inflection point on the object side 142 of the fourth lens 140 that is second nearest to the optical axis to an intersection point where the object side 142 of the fourth lens 140 crosses the optical axis may be expressed as SGI412. The following conditions are satisfied: SGI412=−0.1518 mm and |SGI412|/(|SGI412|+TP4)=0.1482.

The distance perpendicular to the optical axis from the inflection point on the object side 142 of the fourth lens 140 which is the first nearest to the optical axis to the optical axis may be expressed as HIF411. The distance perpendicular to the optical axis from the inflection point on the image side 144 of the fourth lens 140 which is the first nearest to the optical axis to the optical axis may be expressed as HIF421. The following conditions are satisfied: HIF411=0.2890 mm, HIF421=0.5794 mm, HIF411/HOI=0.0985 and HIF421/ HOI=0.1975.

The distance perpendicular to the optical axis from the inflection point on the object side 142 of the fourth lens 140 that is the second nearest to the optical axis to the optical axis may be expressed as HIF412. The following conditions are satisfied: HIF412=1.3328 mm and HIF412/HOI=0.4543.

In the first embodiment, the distance parallel to the optical axis between the coordinate point of the object side 112 of the first lens 110 at a height of ½ HEP and the image plane may be expressed as ETL. The distance parallel to the optical axis between the coordinate point of the object side 112 of the first lens 110 at a height of ½ HEP and the coordinate point of the image side 144 of the fourth lens 140 at a height of ½ HEP may be expressed as EIN. The following conditions are satisfied: ETL=18.744 mm, EIN=13.339 mm and EIN/ETL=0.658.

The first embodiment meets the following conditions: ETP1=0.949 mm; ETP2=2.483 mm; ETP3=0.345 mm; ETP4=1.168 mm; the sum of ETP1 to ETP4 described above SETP=4.945 mm; TP1=0.918 mm; TP2=2.500 mm; TP3=0.300 mm; TP4=1.248 mm; the sum of TP1 to TP6 described above ΣTP=4.966 mm; SETP/ΣTP=0.996.

The first embodiment particularly controls the ratio relationship (ETP/TP) between the thickness (ETP) of each lens at a height of ½ entrance pupil diameter (HEP) and the thickness (TP) of the lens to which the surface belongs on the optical axis in order to achieve a balance between manufacturability and capability of aberration correction. The following relations are satisfied: ETP1/TP1=1.034, ETP2/TP2=0.993, ETP3/TP3=1.148 and ETP4/TP4=0.936.

The first embodiment controls the horizontal distance between each two adjacent lenses at a height of ½ entrance pupil diameter (HEP) to achieve a balance between the degree of miniaturization for the length HOS of the optical image capturing system 10, the manufacturability and the capability of aberration correction. The ratio relationship (ED/IN) of the horizontal distance (ED) between the two adjacent lens at the height of ½ entrance pupil diameter (HEP) to the horizontal distance (IN) on the optical axis between the two adjacent lens is particularly controlled. The following relations are satisfied: The horizontal distance parallel to the optical axis between the first lens and the second lens at a height of ½ entrance pupil diameter (HEP) ED12=4.529 mm; The horizontal distance parallel to the optical axis between the second lens and the third lens at a height of ½ entrance pupil diameter (HEP) ED23=2.735 mm; The horizontal distance parallel to the optical axis between the third lens and the fourth lens at a height of ½ entrance pupil diameter (HEP) ED34=0.131 mm.

The horizontal distance on the optical axis between the first lens and the second lens IN12=4.571 mm and ED12/ IN12=0.991. The horizontal distance on the optical axis between the second lens 120 and the third lens 130 is IN23=2.752 mm and ED23/IN23=0.994. The horizontal distance on the optical axis between the third lens 130 and the fourth lens 140 is IN34=0.094 mm and ED34/ IN34=1.387.

The horizontal distance parallel to the optical axis between a coordinate point on the image side 144 of the fourth lens 140 at the height of ½ HEP and the image plane may be expressed as EBL=6.405 mm. The horizontal distance parallel to the optical axis between an intersection point where the image side 144 of the fourth lens 140 crosses the optical axis and the image plane 180 may be expressed as BL=6.3642 mm. The embodiment of the present invention may meet the following relation: EBL/BL=1.00641. In the first embodiment, the distance parallel to the optical axis between the coordinate point on the image side 144 of the fourth lens 140 at the height of ½ HEP and the IR-bandstop filter 170 may be expressed as EIR=0.065 mm. The distance parallel to the optical axis between an intersection point where the image side 144 of the fourth lens 140 crosses the optical axis and the IR-bandstop filter 170 may be expressed as PIR=0.025 mm. The following relation is satisfied: EIR/PIR=2.631.

The IR-bandstop filter 170 is made of glass and is disposed between the fourth lens 140 and the image plane 180 without affecting the focal length of the optical image capturing system 10.

In the optical image capturing system 10 of the first embodiment, the focal length of the optical image capturing system 10 may be expressed as f, the entrance pupil diameter of the optical image capturing system 10 may be expressed as HEP, and the half maximum angle of view of the optical image capturing system 10 may be expressed as HAF. The detailed parameters are shown as below: f=3.4375 mm, f/HEP=2.23, HAF=39.69° and tan(HAF)=0.8299.

In the optical image capturing system 10 of the first embodiment, the focal length of the first lens 110 may be expressed as f1 and the focal length of the fourth lens 140 may be expressed as f4. The following conditions are satisfied: f1=3.2736 mm, |f/f1|=1.0501, f4=−8.3381 mm and |f1/f4|=0.3926.

In the optical image capturing system of the first embodiment, the focal length of the second lens 120 may be expressed as f2 and the focal length of the third lens 130 may be expressed as f3. The following conditions are satisfied: |f2|+|f3|=10.0976 mm, |f1|+|f4|=11.6116 mm and |f2|+|f3|<|f1|+|f4|.

A ratio of the focal length f of the optical image capturing system 10 to the focal length fp of each lens with positive refractive power may be expressed as PPR. A ratio of the focal length f of the optical image capturing system 10 to the focal length fn of each lens with negative refractive power may be expressed as NPR. In the optical image capturing system of the first embodiment, the sum of the PPR of all lenses with positive refractive powers may be expressed as ΣPPR=|f/f1|+|f/f2|=1.95585. The sum of the NPR of all lenses with negative refractive powers may be expressed as ΣNPR=|f3+|f/f4|=0.95770 and ΣPPR/|δNPR=2.04224. The following conditions are also satisfied: |f/f1|=1.05009, |f/f2|=0.90576, |f/f3|=0.54543 and |f/f4|=0.41227.

In the optical image capturing system 10 of the first embodiment, the distance from the object side 112 of the first lens 110 to the image side 144 of the fourth lens 140 may be expressed as InTL. The distance from the object side 112 of the first lens 110 to the image plane 180 may be expressed as HOS. The distance from the aperture 100 to the image plane 180 may be expressed as InS. The half diagonal length of an effective detection field of the image sensing device 190 may be expressed as HOI. The distance from the image side 144 of the fourth lens 140 to the image plane 180 may be expressed as InB. The following conditions are satisfied: InTL+InB=HOS, HOS=4.4250 mm, HOI=2.9340 mm, HOS/HOI=1.5082, HOS/f=1.2873, InTL/HOS=0.7191, InS=4.2128 mm and InS/HOS=0.95204.

In the optical image capturing system 10 of the first embodiment, the sum of thicknesses of all lenses with refractive power on the optical axis may be expressed as ΣTP. The following conditions are satisfied: ΣTP=2.4437 mm and ΣTP/InTL=0.76793. Therefore, this configuration can keep the contrast ratio of the optical image capturing system 10 and the yield rate about manufacturing lens, and provide the proper back focal length to accommodate other elements.

In the optical image capturing system of the first embodiment, the curvature radius of the object side 112 of the first lens 110 may be expressed as R1. The curvature radius of the image side 114 of the first lens 110 may be expressed as R2. The following condition is satisfied: |R1/R2|=0.1853. Hereby, the first lens has a suitable magnitude of the positive refractive power, so as to prevent the spherical aberration from increasing too fast.

In the optical image capturing system of the first embodiment, the curvature radius of the object side 142 of the fourth lens 140 may be expressed as R7. The curvature radius of the image side 144 of the fourth lens 140 may be expressed as R8. The following condition is satisfied: (R7−R8)/(R7+R8)=0.2756. Therefore, this configuration is beneficial for correcting the astigmatism generated by the optical image capturing system.

In the optical image capturing system of the first embodiment, the focal lengths for the first lens 110 and the second lens 120 may be respectively expressed as f1 and f2. The sum of the focal lengths for all lenses having positive refractive power may be expressed as ΣPP, which satisfies the following conditions: ΣPP=f1+f2=7.0688 mm and f1/(f1+f2)=0.4631. Hereby, this configuration is helpful to distribute the positive refractive power of the first lens to other lenses with positive refractive power in an appropriate way, so as to suppress the generation of noticeable aberrations in the propagating process of the incident light in the optical image capturing system 10.

In the optical image capturing system 10 of the first embodiment, the focal lengths for the third lens 130 and the fourth lens 140 may be respectively expressed as f3 and f4. The sum of the focal lengths for all lenses with negative refractive power may be expressed as ΣNP, which satisfies the following conditions: ΣNP=f3+f4=−14.6405 mm and f4/(f2+f4)=0.5695. Hereby, this configuration is helpful to distribute the negative refractive power of fourth lens to other lenses with negative refractive powers in an appropriate way, so as to suppress the generation of noticeable aberrations in the propagating process of the incident light in the optical image capturing system 10.

In the optical image capturing system 10 of the first embodiment, the distance on the optical axis between the first lens 110 and the second lens 120 may be expressed as IN12. The following conditions are satisfied: IN12=0.3817 mm and IN12/f=0.11105. Hereby, this configuration is helpful to improve the chromatic aberration of the lens in order to elevate the performance of the optical image capturing system 10 of the first embodiment.

In the optical image capturing system 10 of the first embodiment, the distance on the optical axis between the second lens 120 and the third lens 130 may be expressed as IN23. The following conditions are satisfied: IN23=0.0704 mm and IN23/f=0.02048. Hereby, the configuration is helpful to improve the chromatic aberration of the lens in order to elevate the performance of the optical image capturing system 10 of the first embodiment.

In the optical image capturing system of the first embodiment, the distance on the optical axis between the third lens 130 and the fourth lens 140 may be expressed as IN34. The following conditions are satisfied: IN34=0.2863 mm and IN34/f=0.08330. Hereby, the configuration is helpful to improve the chromatic aberration of the lens in order to elevate the performance of the optical image capturing system 10 of the first embodiment.

In the optical image capturing system 10 of the first embodiment, thicknesses of the first lens 110 and the second lens 120 on the optical axis may be expressed as TP1 and TP2, respectively. The following conditions are satisfied: TP1=0.46442 mm, TP2=0.39686 mm, TP1/TP2=1.17023 and (TP1+IN12)/TP2=2.13213. Therefore, this configuration is helpful to control the sensitivity generated by the optical image capturing system 10 and elevate the performance of the optical image capturing system 10 of the first embodiment.

In the optical image capturing system of the first embodiment, thicknesses of the third lens 130 and the fourth lens 140 on the optical axis may be expressed as TP3 and TP4, respectively. The distance on the optical axis between the third lens 130 and the fourth lens 140 may be expressed as IN34. The following conditions are satisfied: TP3=0.70989 mm, TP4=0.87253 mm, TP3/TP4=0.81359 and (TP4+IN34)/TP3=1.63248. Therefore, this configuration is helpful to control the sensitivity generated by the optical image capturing system 10 and reduce the total height of the optical image capturing system 10.

In the optical image capturing system of the first embodiment, the following relations are satisfied: IN23/(TP2+IN23+TP3)=0.05980. Therefore, this configuration is helpful to slightly correct the aberration of the propagating process of the incident light layer by layer and decrease the total height of the optical image capturing system 10.

In the optical image capturing system of the first embodiment, the horizontal distance parallel to the optical axis from a maximum effective diameter position on the object side 144 of the fourth lens 140 to the intersection point where the object side 142 of the fourth lens 140 crosses the optical axis may be expressed as InRS41. The horizontal distance parallel to the optical axis from a maximum effective diameter position on the image side 144 of the fourth lens 140 to an intersection point where the image side 144 of the fourth lens 140 crosses the optical axis may be expressed as InRS42. The thickness of the fourth lens 140 on the optical axis may be expressed as TP4. The following conditions are satisfied: InRS41=−0.23761 mm, InRS42=−0.20206 mm, |InRS41|+|InRS42|=0.43967 mm, |InRS41|/TP4=0.27232 and |InRS42|/TP4=0.23158. Hereby, the configuration is favorable to the manufacturing and forming of the lens and maintaining the minimization for the optical image capturing system.

In the optical image capturing system of the first embodiment, the perpendicular distance between a critical point C41 on the object side 142 of the fourth lens 140 and the optical axis may be expressed as HVT41. The perpendicular distance between a critical point C42 on the image side 144 of the fourth lens 140 and the optical axis may be expressed as HVT42. The following conditions are satisfied: HVT41=0.5695 mm, HVT42=1.3556 mm and HVT41/HVT42=0.4201. With this configuration, the off-axis aberration could be corrected effectively.

In the optical image capturing system 10 of the first embodiment, the following condition is satisfied: HVT42/HOI=0.4620. Therefore, this configuration is helpful to correct the aberration of surrounding field of view of the optical image capturing system 10.

In the optical image capturing system 10 of the first embodiment, the following condition is satisfied: HVT42/HOS=0.3063. Therefore, this configuration is helpful to correct the aberration of surrounding field of view of the optical image capturing system 10.

In the optical image capturing system 10 of the first embodiment, the coefficient of dispersion of the first lens 110 may be expressed as NA1. The coefficient of dispersion of the second lens 120 may be expressed as NA2. The coefficient of dispersion of the third lens 130 may be expressed as NA3. The coefficient of dispersion of the fourth lens 140 may be expressed as NA4. The following conditions are satisfied: |NA1−NA2|=0 and NA3/NA2=0.39921. Hereby, this configuration is helpful to correct the chromatic aberration of the optical image capturing system 10.

In the optical image capturing system 10 of the first embodiment, TV distortion and optical distortion for image formation in the optical image capturing system 10 may be expressed as TDT and ODT, respectively. The following conditions are satisfied: |TDT|=0.4% and |ODT|=2.5%.

In the optical image capturing system 10 of the first embodiment, the modulation transfer rates (values of MTF) of half frequency at positions of the optical axis, 0.3 HOI and 0.7 HOI on the image plane may be respectively expressed as MTFH0, MTFH3 and MTFH7. The following conditions are satisfied: MTFH0 is about 0.525, MTFH3 is about 0.375, and MTFH7 is about 0.35.

Table 1 and Table 2 below should be incorporated into the reference of the first embodiment.

TABLE 1

Lens Parameter for the First Embodiment
f (focal length) = 3.4375 mm; f/HEP = 2.23;
HAF (half angle of view) = 39.6900 deg; tan(HAF) = 0.8299;

| Surface No. | | Curvature Radius | Thickness | Material |
|---|---|---|---|---|
| 0 | Object | Plane | At infinity | |
| 1 | First Lens/ Aperture | 1.466388 | 0.464000 | Plastic |
| 2 | | 7.914480 | 0.382000 | |
| 3 | Second Lens | −5.940659 | 0.397000 | Plastic |
| 4 | | −1.551401 | 0.070000 | |
| 5 | Third Lens | −0.994576 | 0.710000 | Plastic |
| 6 | | −1.683933 | 0.286000 | |
| 7 | Fourth Lens | 2.406736 | 0.873000 | Plastic |
| 8 | | 1.366640 | 0.213000 | |
| 9 | IR-bandstop Filter | Plane | 0.210000 | BK7_SCHOTT |
| 10 | | Plane | 0.820000 | |
| 11 | Image Plane | Plane | | |

| Surface No. | Refractive Index | Coefficient of Dispersion | Focal Length |
|---|---|---|---|
| 0 | | | |
| 1 | 1.535 | 56.07 | 3.274 |
| 2 | | | |
| 3 | 1.535 | 56.07 | 3.795 |
| 4 | | | |
| 5 | 1.642 | 22.46 | −6.302 |
| 6 | | | |
| 7 | 1.535 | 56.07 | −8.338 |
| 8 | | | |
| 9 | 1.517 | 64.13 | |
| 10 | | | |
| 11 | | | |

Reference wavelength = 555 nm. Shield Position: the 8th surface with effective radius = 2.320 mm.

TABLE 2

Aspheric Coefficients of the First Embodiment
Table 2: Aspheric Coefficients

| Surface No. | 1 | 2 | 3 | 4 |
|---|---|---|---|---|
| k= | −1.595426E+00 | −7.056632E+00 | −2.820679E+01 | −1.885740E+00 |
| A4= | −4.325520E−04 | −2.633963E−02 | −1.367865E−01 | −9.745260E−02 |
| A6= | 1.103749E+00 | 2.088207E−02 | 3.135755E−01 | −1.032177E+00 |
| A8= | −8.796867E+00 | −1.122861E−01 | −6.149514E+00 | 8.016230E+00 |
| A10= | 3.981982E+01 | −7.137813E−01 | 3.883332E+01 | −4.215882E+01 |
| A12= | −1.102573E+02 | 2.236312E+00 | −1.463622E+02 | 1.282874E+02 |
| A14= | 1.900642E+02 | −2.756305E+00 | 3.339863E+02 | −2.229568E+02 |
| A16= | −2.000279E+02 | 1.557080E+00 | −4.566510E+02 | 2.185571E+02 |
| A18= | 1.179848E+02 | −2.060190E+00 | 3.436469E+02 | −1.124538E+02 |
| A20= | −3.023405E+01 | 2.029630E+00 | −1.084572E+02 | 2.357571E+01 |

| Surface No. | 5 | 6 | 7 | 8 |
|---|---|---|---|---|
| k= | 1.013988E−01 | −3.460337E+01 | −4.860907E+01 | −7.091499E+00 |
| A4= | 2.504976E−01 | −9.580611E−01 | −2.043197E−01 | −8.148585E−02 |
| A6= | −1.640463E+00 | 3.303418E+00 | 6.516636E−02 | 3.050566E−02 |
| A8= | 1.354700E+01 | −8.544412E+00 | 4.863926E−02 | −8.218175E−03 |
| A10= | −6.223343E+01 | 1.602487E+01 | −7.086809E−02 | 1.186528E−03 |
| A12= | 1.757259E+02 | −2.036011E+01 | 3.815824E−02 | −1.305021E−04 |
| A14= | −2.959459E+02 | 1.703516E+01 | −1.032930E−02 | 2.886943E−05 |
| A16= | 2.891641E+02 | −8.966359E+00 | 1.413303E−03 | −6.459004E−06 |
| A18= | −1.509364E+02 | 2.684766E+00 | −8.701682E−05 | 6.571792E−07 |
| A20= | 3.243879E+01 | −3.481557E−01 | 1.566415E−06 | −2.325503E−08 |

Table 1 is the detailed structural data to the first embodiment in FIG. 1A, wherein the unit for the curvature radius, the thickness, the distance, and the focal length is millimeters (mm). Surfaces 0-14 illustrate the surfaces from the object side to the image side in the optical image capturing system. Table 2 shows the aspheric coefficients of the first embodiment, wherein k is the conic coefficient in the aspheric surface equation, and $A_1$-$A_{20}$ are respectively the first to the twentieth order aspheric surface coefficients. Furthermore, the tables in the following embodiments correspond to the schematic view and the aberration graphs, respectively, and definitions of parameters in these tables are similar to those in the Table 1 and the Table 2, so the repetitive details will not be given here.

Second Embodiment

Figure 2A:
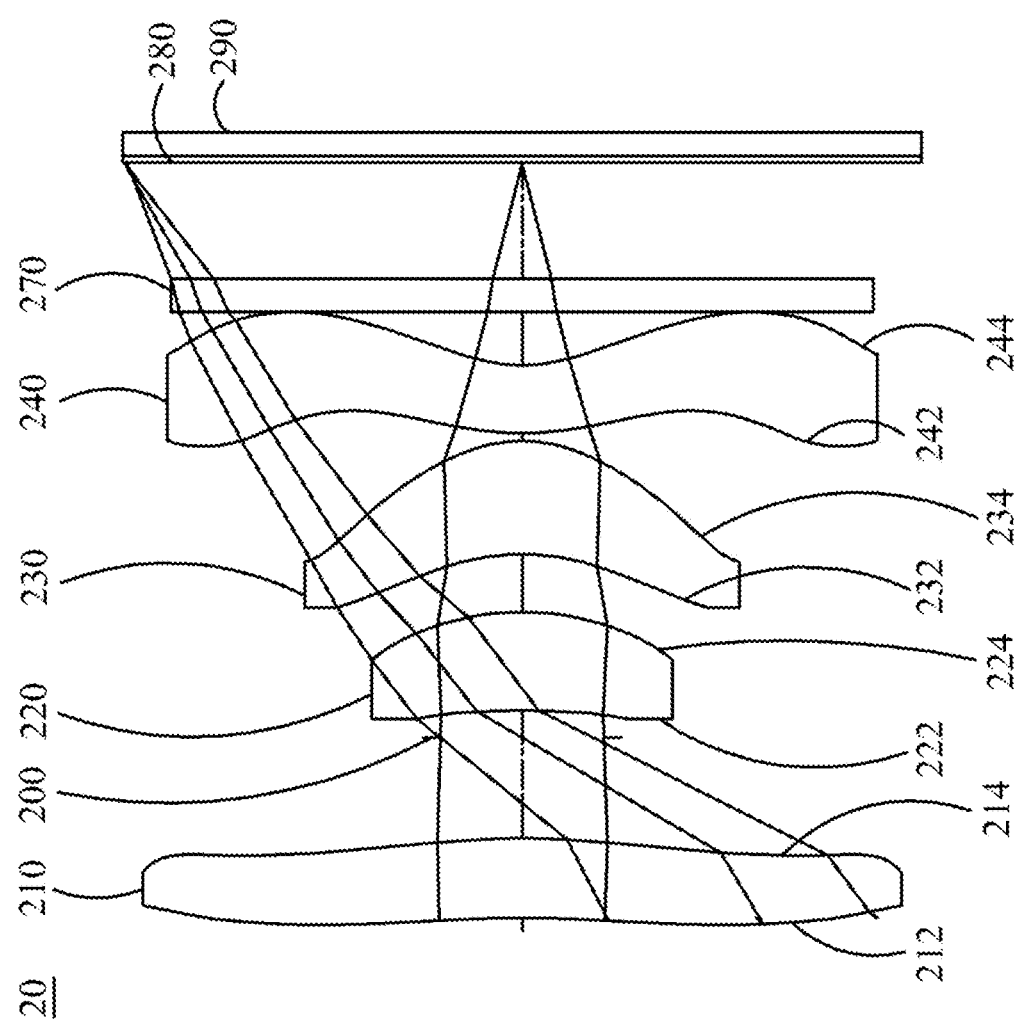
FIG. 2A is a schematic view of the optical image capturing system according to the second embodiment of the present invention.
Figure 2B:
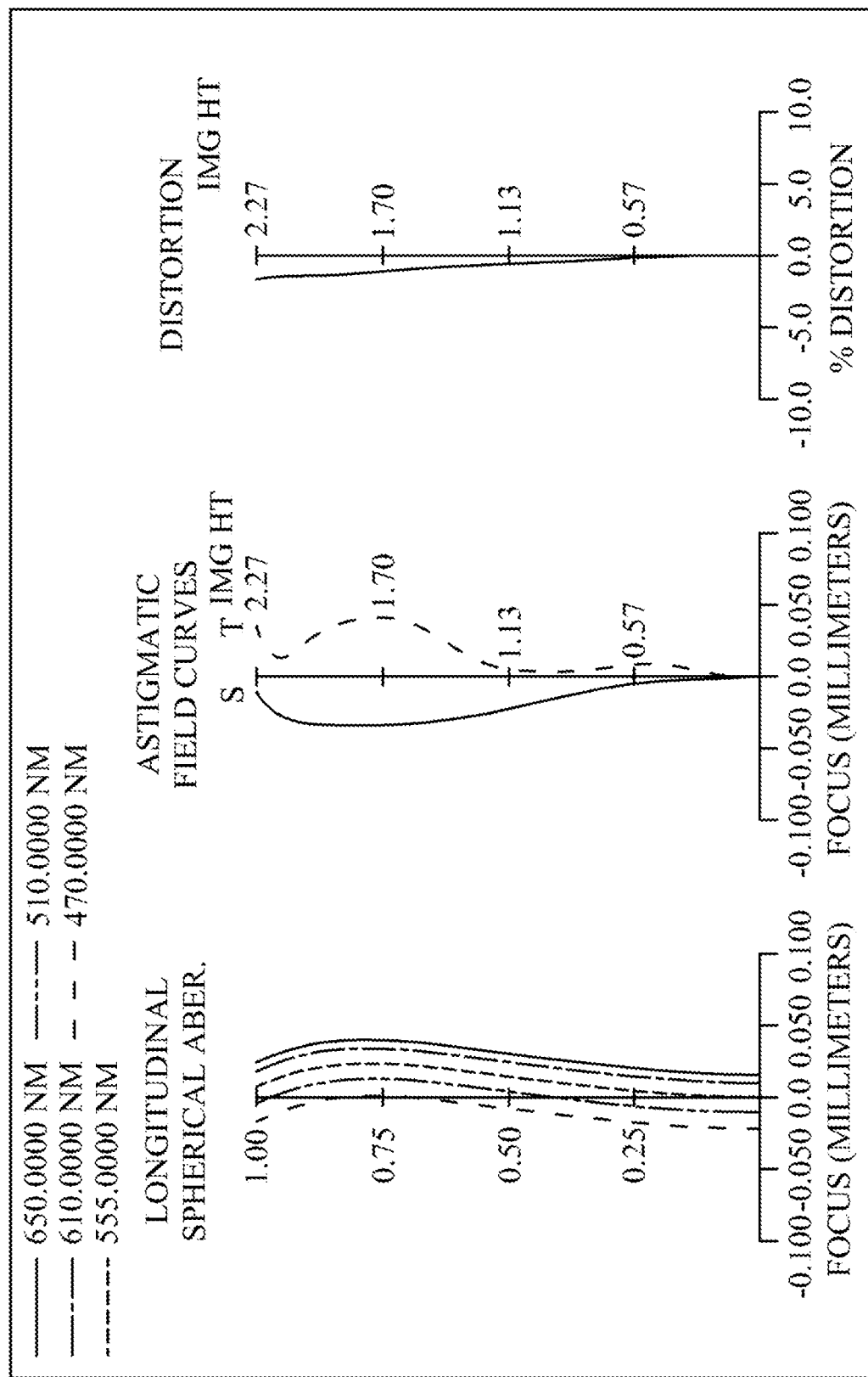
FIG. 2B shows the longitudinal spherical aberration curves, the astigmatic field curves, and the optical distortion of the optical image capturing system in the order from left to right according to the second embodiment of the present invention.
Figure 2C:
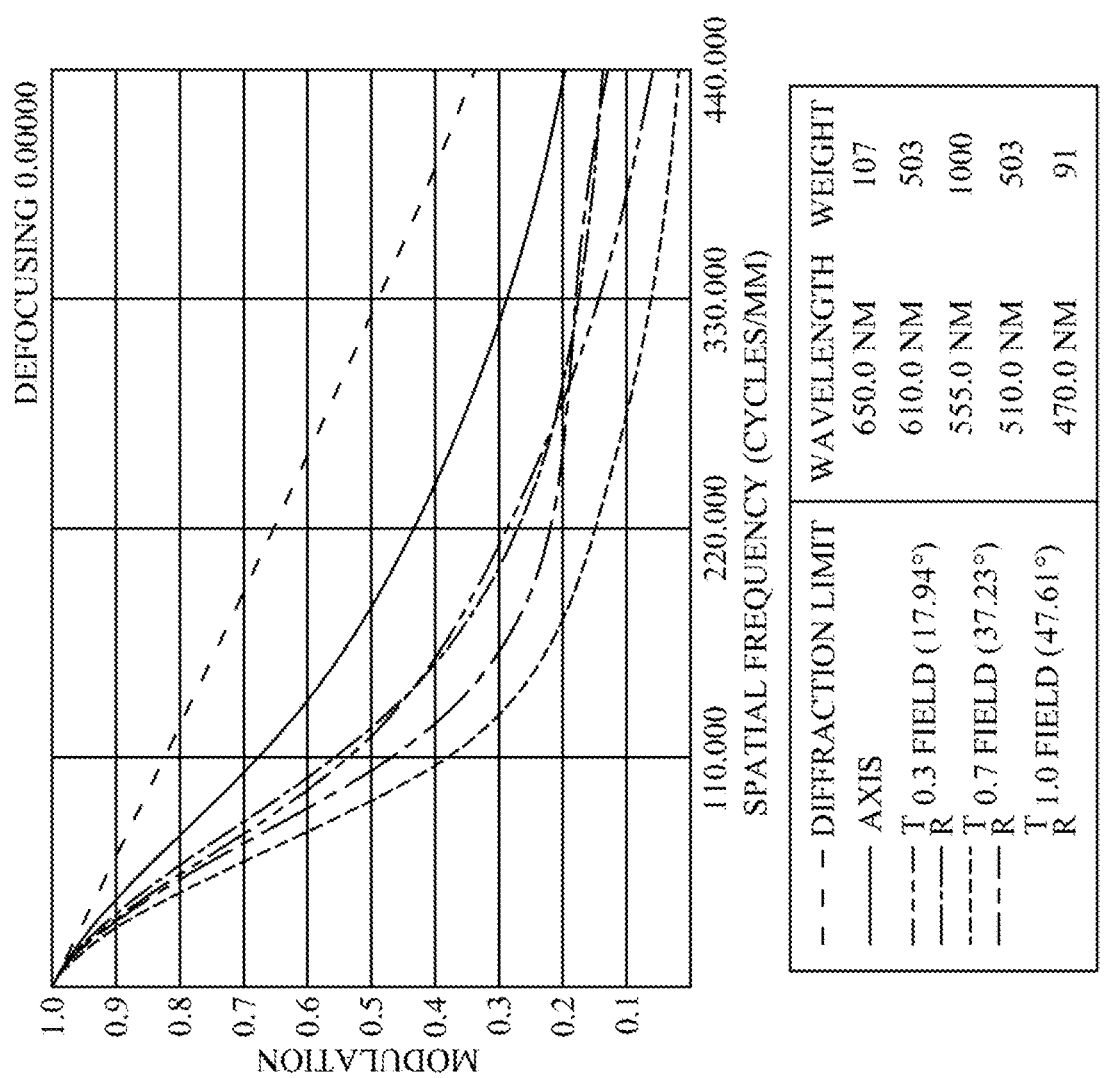
FIG. 2C is a characteristic diagram of modulation transfer of visible light spectrum for the optical image capturing system according to the second embodiment of the present invention.

Please refer to FIG. 2A, FIG. 2B and FIG. 2C. FIG. 2A is a schematic view of the optical image capturing system according to the second embodiment of the present invention. FIG. 2B shows the longitudinal spherical aberration curves, astigmatic field curves, and an optical distortion of the optical image capturing system in the order from left to right according to the second embodiment of the present invention. FIG. 2C is a characteristic diagram of modulation transfer of visible light for the optical image capturing system according to the second embodiment of the present invention.

As shown in FIG. 2A, in the order from an object side to an image side, the optical image capturing system 20 includes a first lens 210, an aperture 200, a second lens 220, a third lens 230, a fourth lens 240, an IR-bandstop filter 270, an image plane 280 and an image sensing device 290.

The first lens 210 has positive refractive power and is made of plastic. The object side 212 of the first lens 210 is a concave surface and the image side 214 of the first lens 210 is a convex surface, and the object side 212 and the image side 214 of the first lens 210 are both aspheric. The object side 212 and the image side 214 of the first lens 210 both have one inflection point.

The second lens 220 has positive refractive power and is made of plastic. The object side 222 of the second lens 220 is a concave surface and the image side 224 of the second lens 220 is a convex surface, and the object side 222 and the image side 224 of the second lens 220 are both aspheric. The image side 224 of the second lens 220 has one inflection point.

The third lens 230 has positive refractive power and is made of plastic. The object side 232 of the third lens 230 is a concave surface and the image side 234 of the third lens 230 is a convex surface, and the object side 232 and an image side 234 of the third lens 230 are both aspheric. The object side 232 and the image side 234 of the third lens 230 both have one inflection point.

The fourth lens 240 has negative refractive power and is made of plastic. The object side 242 of the fourth lens 240 is a convex surface and the image side 244 of the fourth lens 240 is a concave surface, and the object side 242 and the image side 244 of the fourth lens 240 are both aspheric. The object side 242 of the fourth lens 240 has two inflection points. The image side 244 of the fourth lens 240 has one inflection point.

The IR-bandstop filter 270 is made of glass and is disposed between the fourth lens 240 and the image plane 280, without affecting the focal length of the optical image capturing system 20.

Table 3 and Table 4 below should be incorporated into the reference of the second embodiment

TABLE 3

Lens Parameters for the Second Embodiment
f (focal length) = 2.10143 mm; f/HEP = 2.22;
HAF (half angle of view) = 47.5497 deg

| Surface No. | | Curvature Radius | Thickness (mm) | Material |
|---|---|---|---|---|
| 0 | Object | 1E+18 | 1E+11 | |
| 1 | First Lens | −11.88977536 | 0.613 | Plastic |
| 2 | | −5.913154724 | 0.628 | |

TABLE 3-continued

Lens Parameters for the Second Embodiment
f (focal length) = 2.10143 mm; f/HEP = 2.22;
HAF (half angle of view) = 47.5497 deg

| | | | | |
|---|---|---|---|---|
| 3 | Aperture | 1E+18 | 0.209 | |
| 4 | Second Lens | −6.180637094 | 0.391 | Plastic |
| 5 | | −1.649843547 | 0.135 | |
| 6 | Third Lens | −1.647323656 | 1.041 | Plastic |
| 7 | | −0.751718424 | 0.025 | |
| 8 | Fourth Lens | 2.157604558 | 0.560 | Plastic |
| 9 | | 0.823100315 | 0.313 | |
| 10 | IR-bandstop filter | 1E+18 | 0.210 | BK7_SCHOTT |
| 11 | | 1E+18 | 0.845 | |
| 12 | Image Plane | 1E+18 | 0.000 | |

TABLE 3-continued

Lens Parameters for the Second Embodiment
f (focal length) = 2.10143 mm; f/HEP = 2.22;
HAF (half angle of view) = 47.5497 deg

| Surface No. | Refractive Index | Coefficient of Dispersion | Focal Length |
|---|---|---|---|
| 0 | | | |
| 1 | 1.636 | 23.879 | 17.882 |
| 2 | | | |
| 3 | | | |
| 4 | 1.545 | 55.938 | 4.019 |
| 5 | | | |
| 6 | 1.545 | 55.938 | 1.805 |
| 7 | | | |
| 8 | 1.636 | 23.879 | −2.511 |
| 9 | | | |
| 10 | 1.517 | 64.13 | |
| 11 | | | |
| 12 | | | |

Reference Wavelength = 555 nm. Shield Position: the 1st surface with effective radius = 1.988 mm; the 2nd surface with effective radius = 1.739 mm; the 4th surface with effective radius = 0.746 mm; the 6th surface with effective radius = 1.237 mm; the 8th surface with effective radius = 2.030 mm.

TABLE 4

The Aspheric Coefficients of the Second Embodiment
Table 4: Aspheric Coefficients

| Surface No. | 1 | 2 | 4 | 5 |
|---|---|---|---|---|
| k= | 0.000000E+00 | 0.000000E+00 | 0.000000E+00 | 0.000000E+00 |
| A4= | 7.878770E−02 | 1.382302E−01 | −2.177785E−01 | −1.682374E−02 |
| A6= | −3.867733E−02 | −1.225176E−01 | −1.703155E+00 | −1.758705E+00 |
| A8= | 1.837466E−02 | 8.254309E−02 | 1.649357E+01 | 1.106593E+01 |
| A10= | −7.240358E−02 | −3.798359E−02 | −9.999967E+01 | −4.688490E+01 |
| A12= | 2.050255E−03 | 1.155461E−02 | 3.226780E+02 | 1.129285E+02 |
| A14= | −3.390119E−04 | −2.133031E−03 | −5.929810E+02 | −1.486292E+02 |
| A16= | 2.378922E−05 | 1.817664E−04 | 5.092632E+02 | 8.253415E+01 |

| Surface No. | 6 | 7 | 8 | 9 |
|---|---|---|---|---|
| k= | 0.000000E+00 | −8.634555E−01 | 0.000000E+00 | −4.919196E+00 |
| A4= | 1.868390E−01 | 3.359970E−01 | −2.150156E−01 | −9.940599E−02 |
| A6= | −9.653348E−01 | −5.772393E−01 | 2.397846E−02 | 2.997505E−02 |
| A8= | 3.356111E+00 | 7.411406E−01 | 2.399935E−02 | −6.462542E−03 |
| A10= | −7.254689E+00 | −6.088032E−01 | −1.370006E−02 | 8.465780E−04 |
| A12= | 9.674105E+00 | 3.073818E−01 | 3.166576E−03 | −9.913837E−05 |
| A14= | −6.640191E+00 | −6.343459E−02 | −2.847702E−04 | 8.114679E−06 |
| A16= | 1.771387E+00 | 0.000000E+00 | 0.000000E+00 | 0.000000E+00 |

In the second embodiment, the presentation of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 3 and Table 4.

| Second Embodiment (Primary reference wavelength = 555 nm) | | | | | |
|---|---|---|---|---|---|
| MTFE0 | MTFE3 | MTFE7 | MTFQ0 | MTFQ3 | MTFQ7 |
| 0.88 | 0.83 | 0.77 | 0.67 | 0.54 | 0.38 |
| ETP1 | ETP2 | ETP3 | ETP4 | ED12/ED23 | SED |
| 0.606 | 0.350 | 0.969 | 0.620 | 5.555 | 1.164 |
| ETP1/TP1 | ETP2/TP2 | ETP3/TP3 | ETP4/TP4 | ED23/ED34 | SETP |
| 0.988 | 0.895 | 0.931 | 1.107 | 0.730 | 2.545 |

Second Embodiment (Primary reference wavelength = 555 nm)

| ETL | EBL | EIN | EIR | PIR | STP |
|---|---|---|---|---|---|
| 4.976 | 1.267 | 3.709 | 0.212 | 0.313 | 2.605 |
| EIN/ETL | SETP/EIN | EIR/PIR | EBL/BL | BL | SETP/STP |
| 0.745 | 0.686 | 0.677 | 0.9260 | 1.3683 | 0.977 |
| ED12 | ED23 | ED34 | ED12/IN12 | ED23/IN23 | ED34/IN34 |
| 0.816 | 0.147 | 0.201 | 0.975 | 1.086 | 8.044 |
| InRS41 | InRS42 | HVT41 | HVT42 | ODT % | TDT % |
| −0.06772 | 0.16797 | 0.84993 | 1.33288 | −1.70508 | 1.05174 |
| $1+\|f/f1\|$ | $1+\|f/f2\|$ | $1+\|f/f3\|$ | $1+\|f/f4\|$ | $1+\|f1/f2\|$ | $1+\|f2/f3\|$ |
| 0.11752 | 0.52283 | 1.16394 | 0.83675 | 4.44903 | 2.22620 |
| ΣPPR | ΣNPR | ΣPPR/\|ΣNPR\|+ | ΣPP | ΣNP | f1/ΣPP |
| 1.68677 | 0.95427 | 1.76761 | 5.82475 | 15.37059 | 0.69004 |
| f4/ΣNP | IN12/f | IN23/f | IN34/f | TP3/f | TP4/f |
| 1.16339 | 0.39826 | 0.06437 | 0.01190 | 0.49535 | 0.26628 |
| InTL | HOS | HOS/HOI | InS/HOS | InTL/HOS | ΣTP/InTL |
| 3.60175 | 4.97000 | 2.19523 | 0.75030 | 0.72470 | 0.72314 |
| (TP1 + IN12)/TP2 | (TP4 + IN34)/TP3 | TP1/TP2 | TP3/TP4 | IN23/(TP2 + IN23 + TP3) | |
| 3.70686 | 0.56157 | 1.56709 | 1.86029 | 0.08630 | |
| \|InRS41\|/TP4 | \|InRS42\|/TP4 | HVT42/HOI | HVT42/HOS | | |
| 0.1210 | 0.3002 | 0.5887 | 0.2682 | | |

The following values for the conditional expressions can be obtained from the data in Table 3 and Table 4.

Values Related to Inflection Point of Second Embodiment (Primary Reference Wavelength = 555 nm)

| | | | |
|---|---|---|---|
| HIF111 | 0.3168 | HIF111/HOI | 0.1399 |
| HIF121 | 0.3718 | HIF121/HOI | 0.1642 |
| HIF221 | 0.7277 | HIF221/HOI | 0.3214 |
| HIF311 | 0.6968 | HIF311/HOI | 0.3078 |
| HIF321 | 0.9664 | HIF321/HOI | 0.4268 |
| HIF411 | 0.4565 | HIF411/HOI | 0.2016 |
| HIF412 | 1.4532 | HIF412/HOI | 0.6419 |
| HIF421 | 0.5378 | HIF421/HOI | 0.2375 |
| SGI111 | −0.0035 | \|SGI111\|+/(\|SGI111\|+ + TP1) | 0.0056 |
| SGI121 | −0.0094 | \|+SGI121\|/(\|+SGI121\| + TP1) | 0.0150 |
| SGI221 | −0.2522 | \|+SGI221\|/(\|+SGI221\| + TP2) | 0.3920 |
| SGI311 | −0.1403 | \|SGI311\|+/(\|SGI311\|+ + TP3) | 0.1188 |
| SGI321 | −0.5420 | \|+SGI321\|/(\|+SGI321\| + TP3) | 0.3424 |
| SGI411 | 0.0398 | \|SGI411\|+/(\|SGI411\|+ + TP4) | 0.0663 |
| SGI412 | −0.0409 | \|SGI412\|+/(\|SGI412\|+ + TP4) | 0.0680 |
| SGI421 | 0.1257 | \|+SGI421\|/(\|+SGI421\| + TP4) | 0.1834 |

Third Embodiment

Figure 3A:
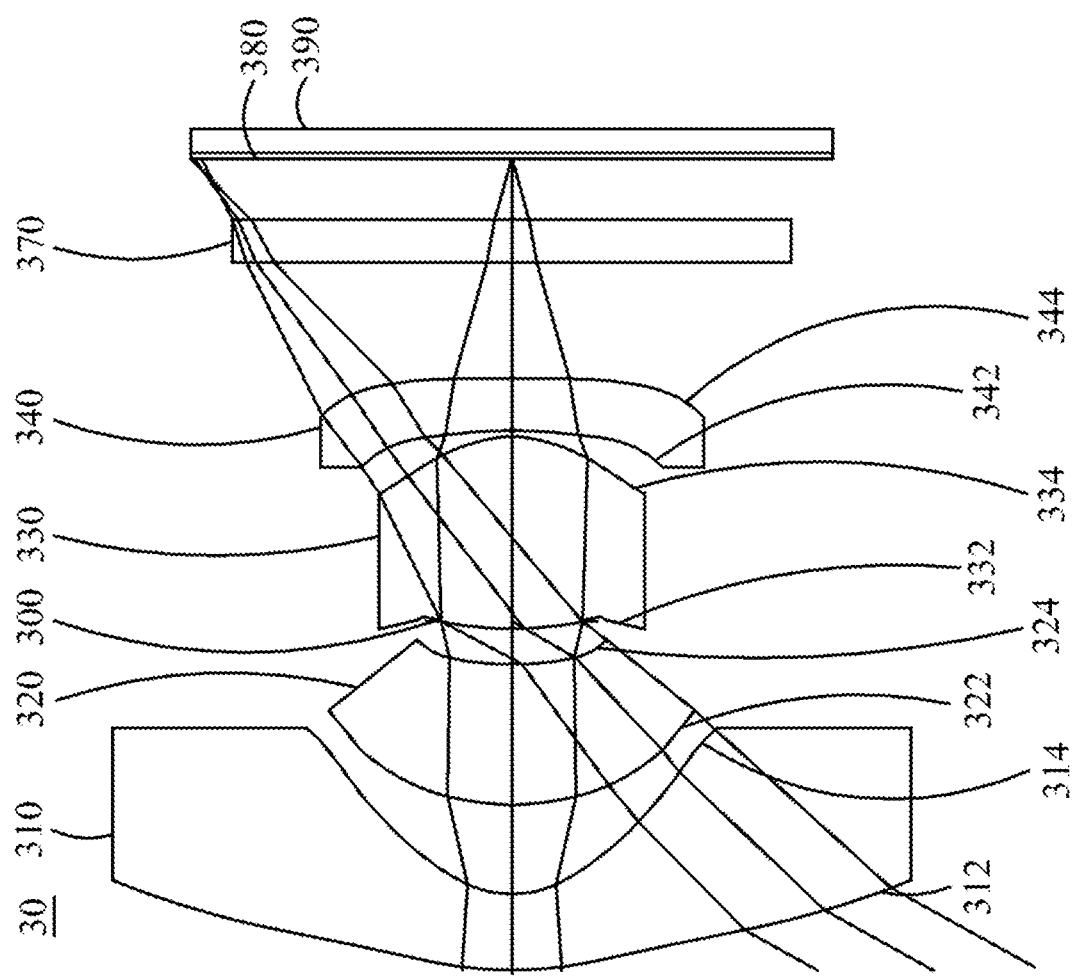
FIG. 3A is a schematic view of the optical image capturing system according to the third embodiment of the present invention.
Figure 3B:
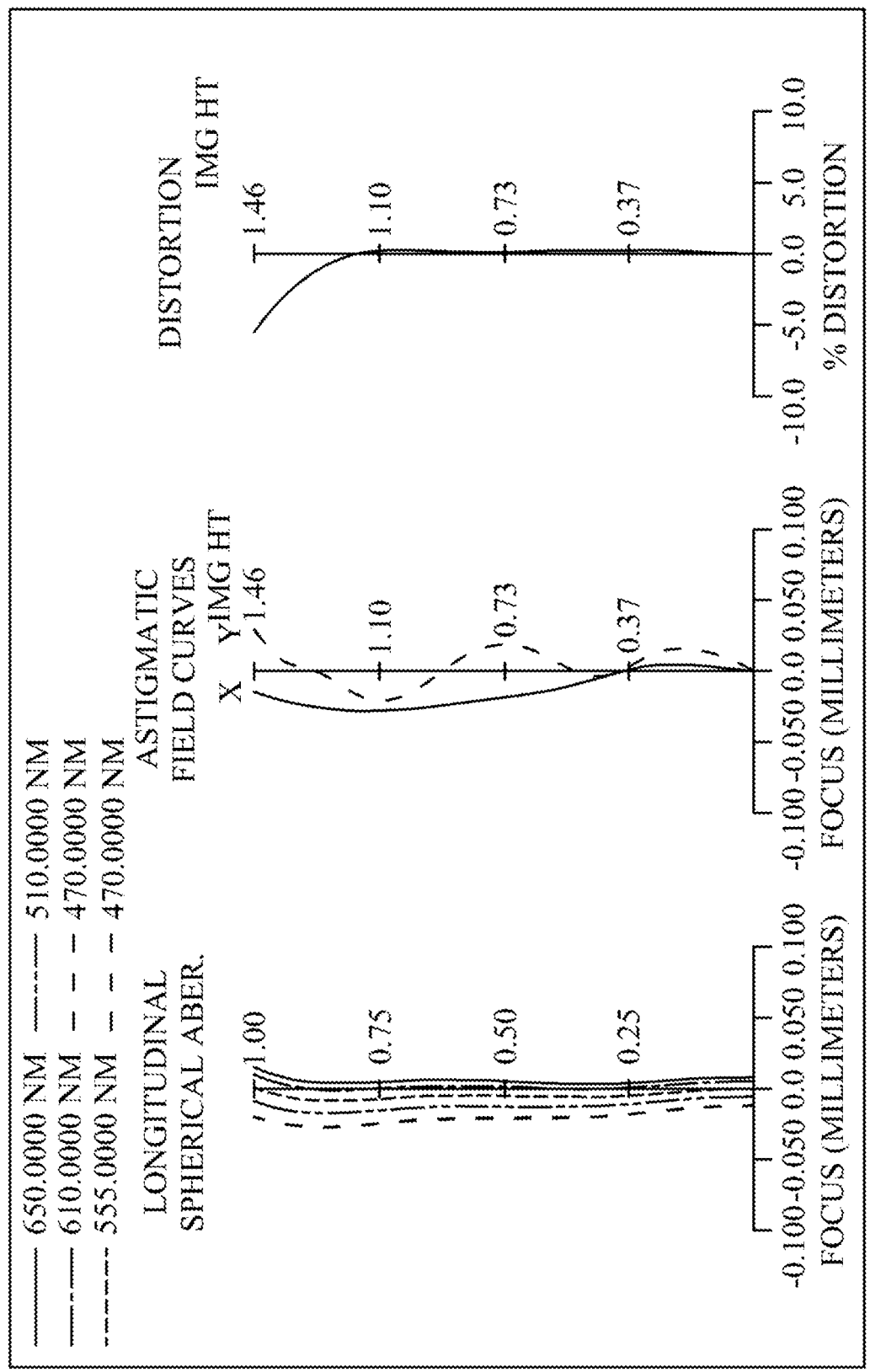
FIG. 3B shows the longitudinal spherical aberration curves, astigmatic field curves, and an optical distortion of the optical image capturing system in the order from left to right according to the third embodiment of the present invention.
Figure 3C:
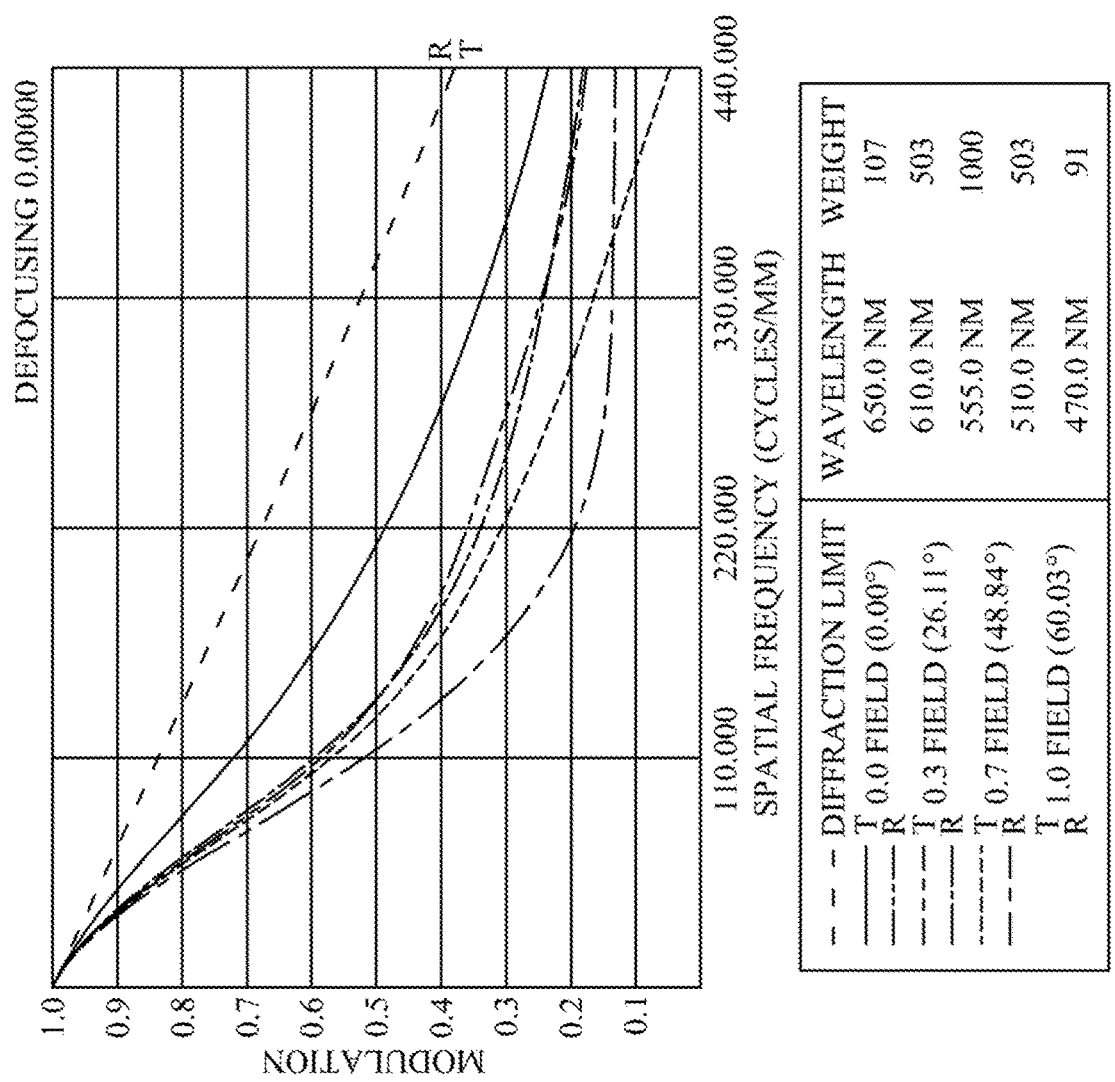
FIG. 3C is a characteristic diagram of modulation transfer of visible light spectrum for the optical image capturing system according to the third embodiment of the present invention.

Please refer to FIG. 3A to FIG. 3C. FIG. 3A is a schematic view of the optical image capturing system—according to the third embodiment of the present invention. FIG. 3B shows the longitudinal spherical aberration curves, astigmatic field curves, and an optical distortion of the optical image capturing system in the order from left to right according to the third embodiment of the present invention. FIG. 3C is a characteristic diagram of modulation transfer of visible light spectrum for the optical image capturing system according to the third embodiment of the present invention.

As shown in FIG. 3A, in the order from an object side to an image side, the optical image capturing system 30 includes a first lens 310, a second lens 320, an aperture 300, a third lens 330, a fourth lens 340, an IR-bandstop filter 370, an image plane 380 and an image sensing device 390.

The first lens 310 has negative refractive power and is made of plastic. The object side 312 of the first lens 310 is a convex surface and the image side 314 of the first lens 310 is a concave surface, and the object side 312 and the image side 314 of the first lens 310 are both aspheric. The object side 312 and the image side 314 of the first lens 310 both have two inflection points.

The second lens 320 has positive refractive power and is made of plastic. The object side 322 of the second lens 320 is a convex surface and the image side 324 of the second lens 320 is a concave surface, and the object side 322 and the image side 324 of the second lens 320 are both aspheric. The object side 322 of the second lens 320 has one inflection point.

The third lens 330 has positive refractive power and is made of plastic. The object side 332 of the third lens 330 is a convex surface and the image side 334 of the third lens 330 is a convex surface, and the object side 332 and the image side 334 of the third lens 330 are both aspheric. The image side 334 of the third lens 330 has one inflection point.

The fourth lens 340 has negative refractive power and is made of plastic. The object side 342 of the fourth lens 340 is a concave surface and the image side 344 of the fourth lens 340 is a concave surface, and the object side 342 and the image side 344 of the fourth lens 340 are both aspheric. The object side 342 of the fourth lens 340 has one inflection point and the image side 344 of the fourth lens 340 has two inflection points.

The IR-bandstop filter 370 is made of glass and is disposed between the fourth lens 340 and the image plane 380 without affecting the focal length of the optical image capturing system 30.

Table 5 and Table 6 below should be incorporated into the reference of the third embodiment.

TABLE 5

Lens Parameters for the Third Embodiment
f (focal length) = 0.8939 mm; f/HEP = 2.1;
HAF (half angle of view) = 60 deg;

| Surface No. | | Curvature Radius | Thickness (mm) | Material |
|---|---|---|---|---|
| 0 | Object | 1E+18 | 5000 | |
| 1 | First Lens | 1.206401993 | 0.375 | Plastic |
| 2 | | 0.368999486 | 0.437 | |
| 3 | Second Lens | 0.936371159 | 0.693 | Plastic |
| 4 | | 1.428571429 | 0.211 | |
| 5 | Aperture | 1E+18 | −0.036 | |
| 6 | Third Lens | 1.481586598 | 0.943 | Plastic |
| 7 | | −0.400406139 | 0.030 | |
| 8 | Fourth Lens | −1.368234789 | 0.254 | Plastic |
| 9 | | 7.807468235 | 0.572 | |
| 10 | IR-bandstop filter | 1E+18 | 0.210 | BK7_SCHOTT |
| 11 | | 1E+18 | 0.300 | |
| 12 | Image Plane | 1E+18 | 0.000 | |

| Surface No. | Refractive Index | Coefficient of Dispersion | Focal Length |
|---|---|---|---|
| 0 | | | |
| 1 | 1.5445 | 55.9377 | −1.156 |
| 2 | | | |
| 3 | 1.66099 | 20.3809 | 2.607 |
| 4 | | | |
| 5 | | | |
| 6 | 1.5445 | 55.9377 | 0.701 |
| 7 | | | |
| 8 | 1.6355 | 23.8791 | −1.799 |
| 9 | | | |
| 10 | 1.517 | 64.13 | |
| 11 | | | |
| 12 | | | |

Reference wavelength = 555 nm

TABLE 6

The Aspheric Coefficients of the Third Embodiment
Table 6: Aspheric Coefficients

| Surface No. | 1 | 2 | 3 | 4 |
|---|---|---|---|---|
| k= | −6.231881E−01 | −1.000912E+00 | −5.165481E+00 | −1.398634E+00 |
| A4= | −5.681048E−01 | −8.141914E−01 | 7.174913E−01 | 5.535078E−01 |
| A6= | 5.793673E−01 | 9.646731E−01 | −3.383900E−01 | 3.111937E+01 |
| A8= | −3.937815E−01 | −3.336046E+00 | −6.594012E+00 | −7.623298E+02 |
| A10= | 1.694138E−01 | 1.334115E+01 | 4.308367E+01 | 1.175003E+04 |
| A12= | −4.542427E−02 | −1.894799E+01 | −1.117920E+02 | −1.011456E+05 |
| A14= | 6.857209E−03 | 6.847104E+00 | 1.410060E+02 | 4.625447E+05 |
| A16= | −4.464738E−04 | 1.730733E+00 | −7.102501E+01 | −8.559139E+05 |

| Surface No. | 6 | 7 | 8 | 9 |
|---|---|---|---|---|
| k= | 1.300904E+00 | −1.035150E+00 | −2.198957E+01 | 8.471548E+01 |
| A4= | 2.298968E−01 | 4.832137E+00 | 2.090172E+00 | −1.082184E+00 |
| A6= | 8.485744E+00 | −4.894000E+01 | −3.114951E+01 | 3.670876E+00 |
| A8= | −2.167700E+02 | 3.579941E+02 | 2.327621E+02 | −1.065687E+01 |
| A10= | 4.237454E+03 | −1.734064E+03 | −1.083441E+03 | 2.096953E+01 |
| A12= | −5.227448E+04 | 5.279304E+03 | 3.031924E+03 | −2.899994E+01 |
| A14= | 3.496465E+05 | −9.210936E+03 | −4.722114E+03 | 2.303720E+01 |
| A16= | −9.575574E+05 | 7.177904E+03 | 3.116313E+03 | −7.934777E+00 |

In the third embodiment, the presentation of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.88 | 0.84 | 0.83 | 0.72 | 0.58 | 0.57 |
| ETP1 | ETP2 | ETP3 | ETP4 | ED12/ED23 | SED |
| 0.417 | 0.687 | 0.877 | 0.268 | 2.322 | 0.642 |
| ETP1/TP1 | ETP2/TP2 | ETP3/TP3 | ETP4/TP4 | ED23/ED34 | SETP |
| 1.112 | 0.991 | 0.930 | 1.054 | 2.577 | 2.249 |
| ETL | EBL | EIN | EIR | PIR | STP |
| 3.972 | 1.081 | 2.891 | 0.571 | 0.572 | 2.266 |
| EIN/ETL | SETP/EIN | EIR/PIR | EBL/BL | BL | SETP/STP |
| 0.728 | 0.778 | 0.998 | 0.9992 | 1.0819 | 0.993 |
| ED12 | ED23 | ED34 | ED12/IN12 | ED23/IN23 | ED34/IN34 |
| 0.402 | 0.173 | 0.067 | 0.919 | 0.989 | 2.239 |
| InRS41 | InRS42 | HVT41 | HVT42 | ODT % | TDT % |
| −0.18094 | −0.18898 | 0.00000 | 0.19019 | −5.51739 | 5.75103 |
| $\perp+$f/f1| | $\perp+$f/f2| | $\perp+$f/f3| | $\perp+$f/f4| | $\perp+$f1/f2| | $\perp+$f2/f3| |
| 0.77322 | 0.34286 | 1.27485 | 0.49693 | 0.44342 | 3.71831 |
| ΣPPR | ΣNPR | ΣPPR/|ΣNPR|$\perp+$ | ΣPP | ΣNP | f1/ΣPP |
| 1.61771 | 1.27014 | 1.27364 | 3.30830 | −2.95486 | 0.78806 |
| f4/ΣNP | IN12/f | IN23/f | IN34/f | TP3/f | TP4/f |
| 0.39124 | 0.48931 | 0.19578 | 0.03356 | 1.05509 | 0.28469 |
| InTL | HOS | HOS/HOI | InS/HOS | InTL/HOS | ΣTP/InTL |
| 2.90810 | 3.99000 | 2.73299 | 0.56988 | 0.72885 | 0.77911 |
| (TP1 + IN12)/TP2 | (TP4 + IN34)/TP3 | TP1/TP2 | TP3/TP4 | IN23/(TP2 + IN23 + TP3) | |
| 1.17222 | 0.30164 | 0.54114 | 3.70607 | 0.09662 | |
| |InRS41|/TP4 | |InRS42|/TP4 | HVT42/HOI | HVT42/HOS | | |
| 0.7110 | 0.7426 | 0.1303 | 0.0477 | | |

The following values for the conditional expressions can be obtained from the data in Table 5 and Table 6.

| Values Related to Inflection Point of Third Embodiment (Primary Reference Wavelength = 555 nm) | | | |
|---|---|---|---|
| HIF111 | 0.5079 | HIF111/HOI | 0.3479 |
| HIF112 | 0.7290 | HIF112/HOI | 0.4994 |
| HIF121 | 0.7379 | HIF121/HOI | 0.5055 |
| HIF122 | 0.8834 | HIF122/HOI | 0.6051 |
| HIF211 | 0.7639 | HIF211/HOI | 0.5233 |
| HIF321 | 0.4916 | HIF321/HOI | 0.3367 |
| HIF411 | 0.6289 | HIF411/HOI | 0.4308 |
| HIF421 | 0.1053 | HIF421/HOI | 0.0721 |
| HIF422 | 0.8224 | HIF422/HOI | 0.5633 |
| SGI111 | 0.0793 | |SGI111|$\perp+$/(|SGI111|$\perp+$ + TP1) | 0.1746 |
| SGI112 | 0.1297 | |SGI112|$\perp+$/(|SGI112|$\perp+$ + TP1) | 0.2570 |
| SGI121 | 0.6136 | $\perp+$|SGI121|/($\perp+$|SGI121| + TP1) | 0.6206 |
| SGI122 | 0.8080 | $\perp+$|SGI122|/($\perp+$|SGI122| + TP1) | 0.6830 |
| SGI211 | 0.4194 | |SGI211|$\perp+$/(|SGI211|$\perp+$ + TP2) | 0.3770 |
| SGI321 | −0.2230 | $\perp+$|SGI321|/($\perp+$|SGI321| + TP3) | 0.1912 |
| SGI411 | −0.1544 | |SGI411|$\perp+$/(|SGI411|$\perp+$ + TP4) | 0.3777 |
| SGI421 | 0.0006 | $\perp+$|SGI421|/($\perp+$|SGI421| + TP4) | 0.0023 |
| SGI422 | −0.1825 | $\perp+$|SGI422|/($\perp+$|SGI422| + TP4) | 0.4177 |

Fourth Embodiment

Figure 4A:
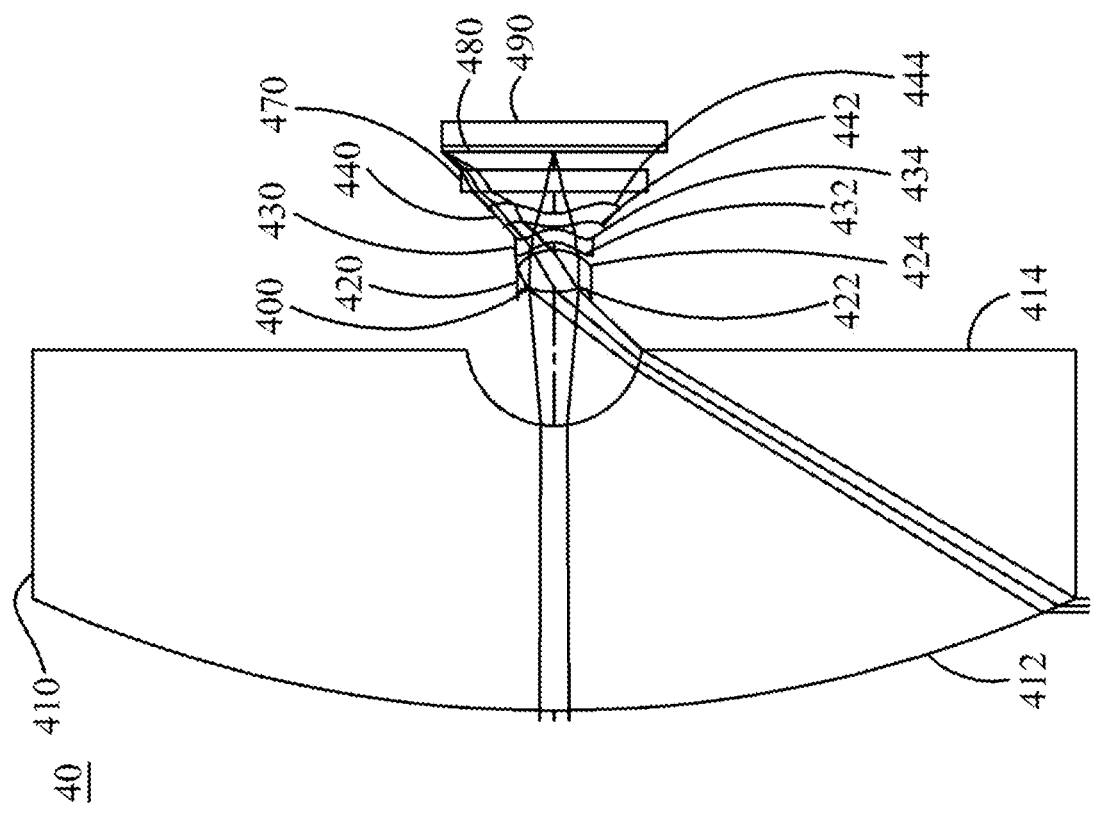
FIG. 4A is a schematic view of the optical image capturing system according to the fourth embodiment of the present invention.
Figure 4B:
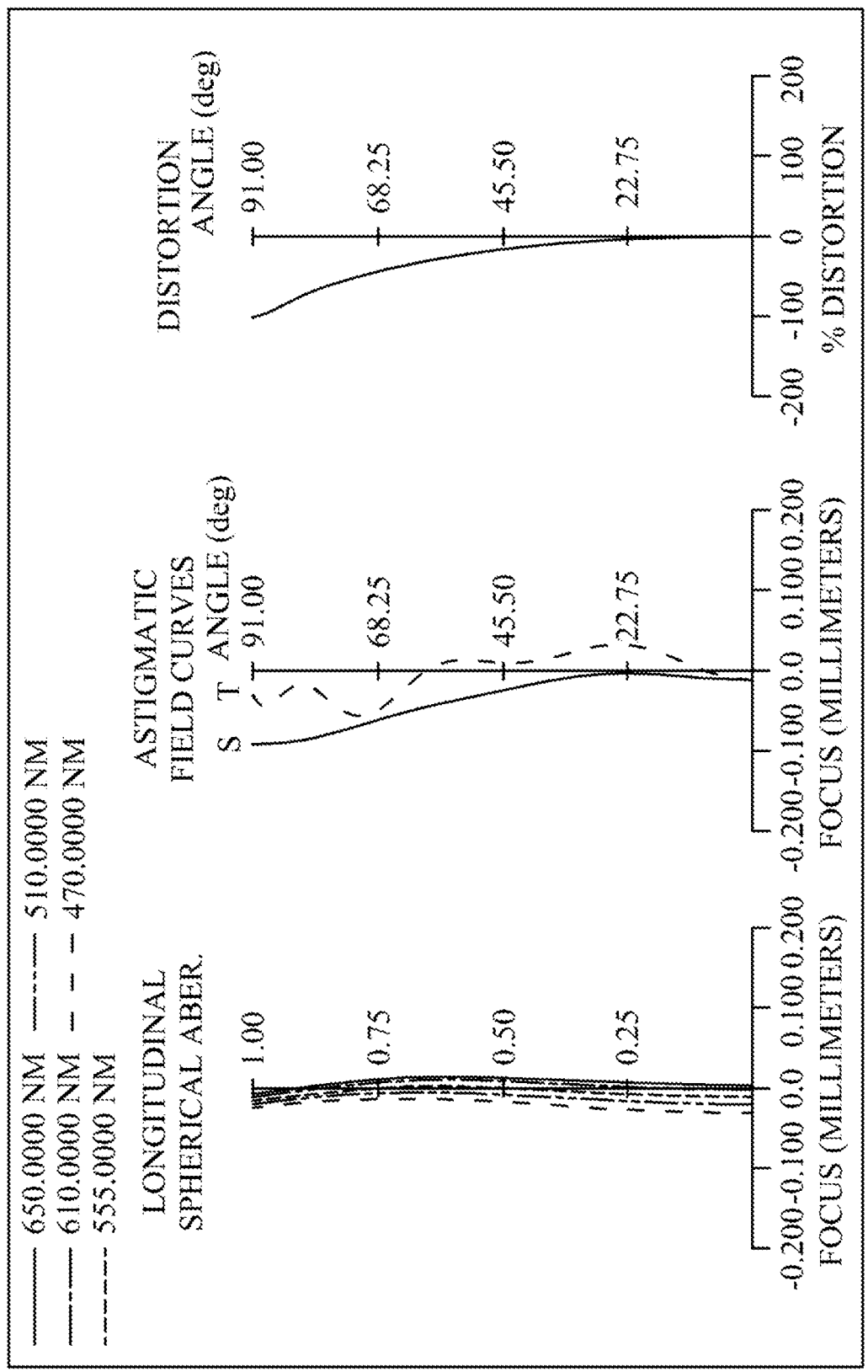
FIG. 4B shows the longitudinal spherical aberration curves, astigmatic field curves, and an optical distortion of the optical image capturing system in the order from left to right according to the fourth embodiment of the present invention.
Figure 4C:
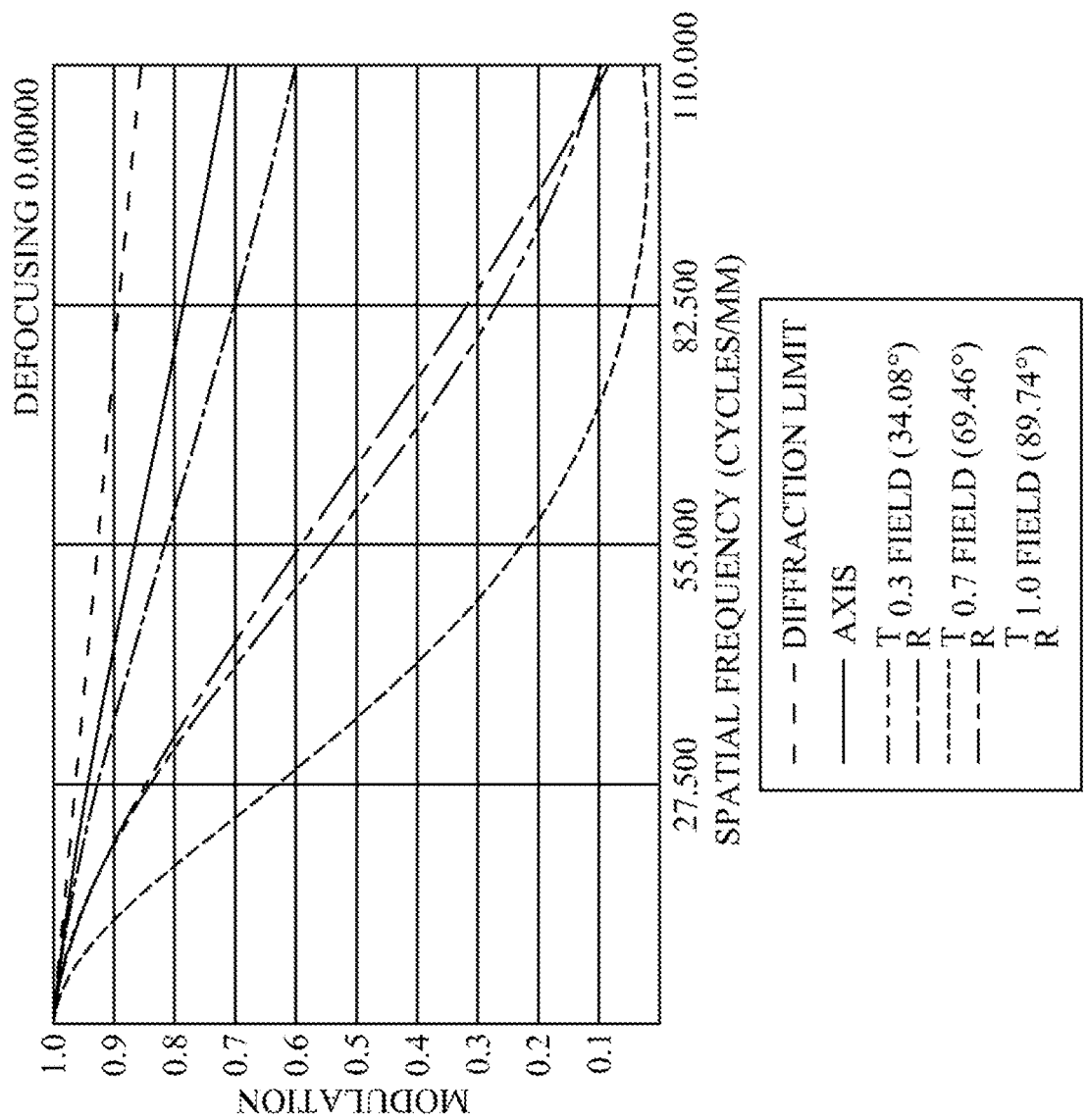
FIG. 4C is a characteristic diagram of modulation transfer of visible light spectrum for the optical image capturing system according to the fourth embodiment of the present invention.

Please refer to FIG. 4A to FIG. 4C. FIG. 4A is a schematic view of the optical image capturing system according to the fourth embodiment of the present invention. FIG. 4B shows the longitudinal spherical aberration curves, astigmatic field curves, and an optical distortion of the optical image capturing system in the order from left to right according to the fourth embodiment of the present invention. FIG. 4C is a characteristic diagram of modulation transfer of visible light spectrum for the optical image capturing system according to the fourth embodiment of the present invention.

As shown in FIG. 4A, in the order from an object side to an image side, the optical image capturing system 40 includes a first lens 410, an aperture 400, a second lens 420, a third lens 430, a fourth lens 440, an IR-bandstop filter 470, an image plane 480 and an image sensing device 490.

The first lens 410 has negative refractive power and is made of glass. The object side 412 of the first lens 410 is a convex surface and the image side 414 of the first lens 410 is a concave surface, and the object side 412 and the image side 414 of the first lens 410 are both aspheric.

The second lens 420 has positive refractive power and is made of plastic. The object side 422 of the second lens 420 is a convex surface and the image side 424 of the second lens 420 is a convex surface, and the object side 422 and the image side 424 of the second lens 420 are both aspheric. The object side 422 of the second lens 420 has one inflection point.

The third lens 430 has positive refractive power and is made of plastic. The object side 432 of the third lens 430 is a concave surface and the image side 434 of the third lens 430 is a convex surface, and the object side 432 and the image side 434 of the third lens 430 are both aspheric. The object side 432 and the image side 434 of the third lens 430 both have one inflection point.

The fourth lens 440 has negative refractive power and is made of plastic. The object side 442 of the fourth lens 440 is a convex surface and the image side 444 of the fourth lens 440 is a concave surface, and the object side 442 and the image side 444 of the fourth lens 440 are both aspheric. The object side 442 and the image side 444 of the fourth lens 440 both have one inflection point.

The IR-bandstop filter 470 is made of glass and is disposed between the fourth lens 440 and the image plane 480 without affecting the focal length of the optical image capturing system 40.

Table 7 and Table 8 below should be incorporated into the reference of the fourth embodiment.

Table 7: Lens Parameters for the Fourth Embodiment

TABLE 7

Lens Parameters for the Fourth Embodiment
f (focal length) = 1.1951 mm; f/HEP = 1.8;
HAF (half angle of view) = 89.9497 deg;

| Surface No. | | Curvature Radius | Thickness (mm) | Material |
|---|---|---|---|---|
| 0 | Object | 1E+18 | 1E+13 | |
| 1 | First Lens | 28.42815345 | 6.528 | Glass |
| 2 | | 2.006013107 | 3.118 | |
| 3 | Aperture | 1E+18 | −0.045 | |
| 4 | Second Lens | 1.691021363 | 0.955 | Plastic |
| 5 | | −1.216537682 | 0.174 | |
| 6 | Third Lens | −0.639093149 | 0.300 | Plastic |
| 7 | | −0.75320371 | 0.050 | |
| 8 | Fourth Lens | 1.3910909 | 0.313 | Plastic |
| 9 | | 1.076615675 | 0.500 | |
| 10 | IR-bandstop filter | 1E+18 | 0.500 | BK7_SCHOTT |
| 11 | | 1E+18 | 0.406 | |
| 12 | Image Plane | 1E+18 | 0.011 | |

| Surface No. | Refractive Index | Coefficient of Dispersion | Focal Length |
|---|---|---|---|
| 0 | | | |
| 1 | 1.569 | 56.04 | −4.155 |
| 2 | | | |
| 3 | | | |
| 4 | 1.565 | 58.00 | 1.417 |
| 5 | | | |
| 6 | 1.661 | 20.40 | 121.688 |
| 7 | | | |
| 8 | 1.661 | 20.40 | −11.871 |
| 9 | | | |
| 10 | 1.517 | 64.13 | |
| 11 | | | |
| 12 | | | |

Reference wavelength = 555 nm.

TABLE 8

The Aspheric Coefficients of the Fourth Embodiment
Table 8: Aspheric Coefficients

| Surface No. | 1 | 2 | 4 | 5 |
|---|---|---|---|---|
| k= | 0.000000E+00 | 0.000000E+00 | −1.038735E+01 | 6.790634E−01 |
| A4= | 0.000000E+00 | 0.000000E+00 | 1.263757E−01 | −2.204672E−01 |
| A6= | 0.000000E+00 | 0.000000E+00 | −5.503593E−01 | 5.590367E−01 |
| A8= | 0.000000E+00 | 0.000000E+00 | 9.216810E−01 | −4.532860E−01 |
| A10= | 0.000000E+00 | 0.000000E+00 | −2.242420E+00 | 5.646939E−02 |
| A12= | 0.000000E+00 | 0.000000E+00 | 0.000000E+00 | 0.000000E+00 |

| Surface No. | 6 | 7 | 8 | 9 |
|---|---|---|---|---|
| k= | −6.692118E−01 | −1.953179E+00 | −1.028572E+00 | −3.293879E+00 |
| A4= | 2.174400E−01 | 4.917091E−02 | −1.988121E−01 | −1.216932E−01 |
| A6= | 1.690734E+00 | 4.910423E−01 | −1.610120E−01 | 3.247207E−03 |
| A8= | −1.958822E+00 | −1.592475E−01 | 1.783118E−01 | 1.304421E−02 |
| A10= | 8.915659E−01 | 7.386421E−02 | −8.365086E−02 | −4.527093E−03 |
| A12= | 0.000000E+00 | 0.000000E+00 | 0.000000E+00 | 0.000000E+00 |

In the fourth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.86 | 0.55 | 0.23 | 0.72 | 0.1 | 0.02 |
| ETP1 | ETP2 | ETP3 | ETP4 | ED12/ED23 | SED |
| 6.554 | 0.876 | 0.315 | 0.323 | 22.082 | 3.372 |
| ETP1/TP1 | ETP2/TP2 | ETP3/TP3 | ETP4/TP4 | ED23/ED34 | SETP |
| 1.004 | 0.917 | 1.049 | 1.033 | 0.894 | 8.068 |
| ETL | EBL | EIN | EIR | PIR | STP |
| 12.809 | 1.370 | 11.440 | 0.453 | 0.500 | 8.097 |
| EIN/ETL | SETP/EIN | EIR/PIR | EBL/BL | BL | SETP/STP |
| 0.893 | 0.705 | 0.906 | 0.9668 | 1.4170 | 0.996 |
| ED12 | ED23 | ED34 | ED12/IN12 | ED23/IN23 | ED34/IN34 |
| 3.077 | 0.139 | 0.156 | 1.001 | 0.800 | 3.114 |
| InRS41 | InRS42 | HVT41 | HVT42 | ODT % | TDT % |
| 0.08593 | 0.21194 | 0.82334 | 1.13171 | −100.18300 | 66.23470 |
| $\perp$+f/f1$\vert$ | $\perp$+f/f2$\vert$ | $\perp$+f/f3$\vert$ | $\perp$+f/f4$\vert$ | $\perp$+f1/f2$\vert$ | $\perp$+f2/f3$\vert$ |
| 0.28764 | 0.84357 | 0.00982 | 0.10068 | 2.93278 | 0.01164 |
| ΣPPR | ΣNPR | ΣPPR/$\vert$ΣNPR$\perp$+ | ΣPP | ΣNP | f1/ΣPP |
| 0.85339 | 0.38831 | 2.19769 | 123.10474 | −16.02568 | 0.01151 |
| f4/ΣNP | IN12/f | IN23/f | IN34/f | TP3/f | TP4/f |
| 0.25927 | 2.57156 | 0.14571 | 0.04188 | 0.25108 | 0.26200 |
| InTL | HOS | HOS/HOI | InS/HOS | InTL/HOS | ΣTP/InTL |
| 11.39440 | 12.81140 | 5.12456 | 0.24707 | 0.88940 | 0.71060 |
| (TP1 + IN12)/TP2 | (TP4 + IN34)/TP3 | TP1/TP2 | TP3/TP4 | IN23/(TP2 + IN23 + TP3) | |
| 10.04959 | 1.21030 | 6.83286 | 0.95831 | 0.12180 | |
| $\vert$InRS41$\vert$/TP4 | $\vert$InRS42$\vert$/TP4 | HVT42/HOI | HVT42/HOS | | |
| 0.2744 | 0.6769 | 0.4527 | 0.0883 | | |

The following values for the conditional expressions can be obtained from the data in Table 7 and Table 8.

| Values Related to Inflection Point of Fourth Embodiment (Primary Reference Wavelength = 555 nm) | | | |
|---|---|---|---|
| HIF211 | 0.4490 | HIF211/HOI | 0.1796 |
| HIF311 | 0.4749 | HIF311/HOI | 0.1900 |
| HIF321 | 0.4780 | HIF321/HOI | 0.1912 |
| HIF411 | 0.4830 | HIF411/HOI | 0.1932 |
| HIF421 | 0.5689 | HIF421/HOI | 0.2276 |
| SGI211 | 0.0535 | $\vert$SGI211$\perp$+$\vert$/ ($\vert$SGI211$\perp$+$\vert$ + TP2) | 0.0530 |
| SGI311 | −0.1594 | $\vert$SGI311$\perp$+$\vert$/ ($\vert$SGI311$\perp$+$\vert$ + TP3) | 0.3470 |
| SGI321 | −0.1314 | $\perp$+/SGI321$\vert$/ $\neq$($\perp$+SGI321$\vert$ + TP3) | 0.3045 |
| SGI411 | 0.0714 | $\vert$SGI411$\perp$+$\vert$/ ($\vert$SGI411$\perp$+$\vert$+TP4) | 0.1857 |
| SGI421 | 0.1193 | $\perp$+/SGI421$\vert$/ $\neq$($\perp$+SGI421$\vert$ + TP4) | 0.2759 |

Fifth Embodiment

Figure 5A:
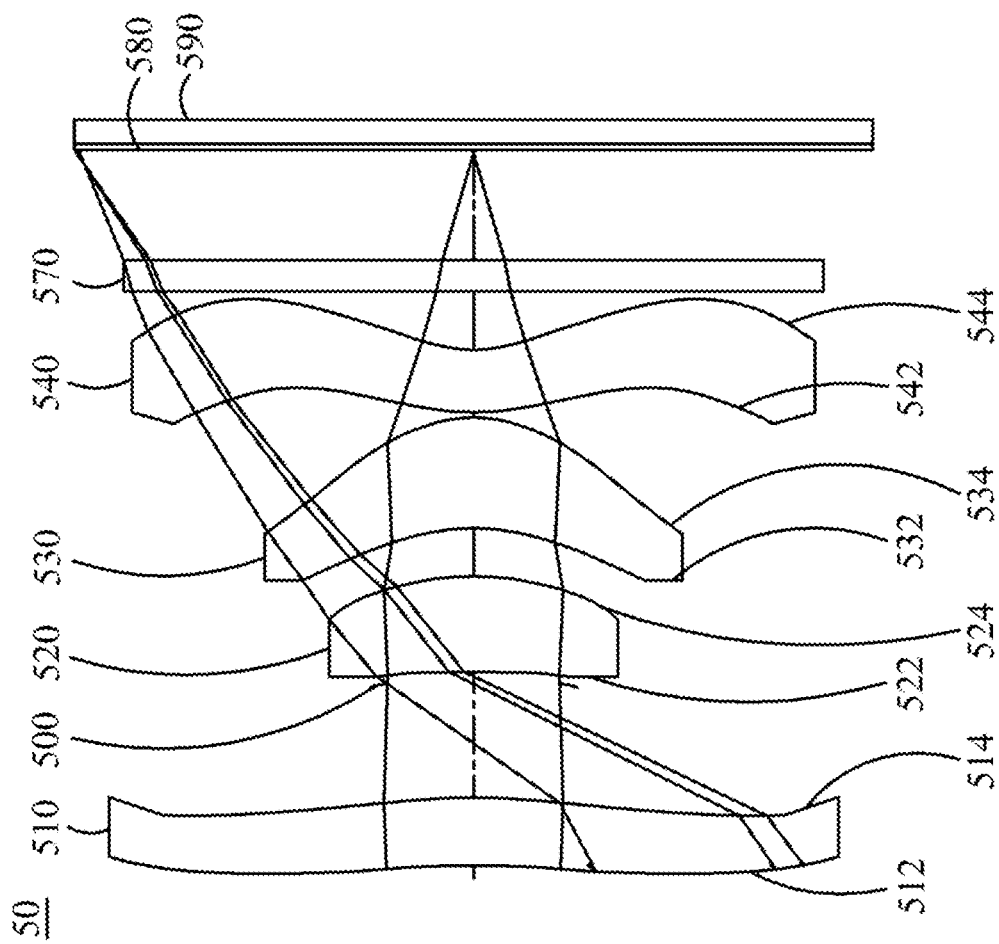
FIG. 5A is a schematic view of the optical image capturing system according to the fifth embodiment of the present invention.
Figure 5B:
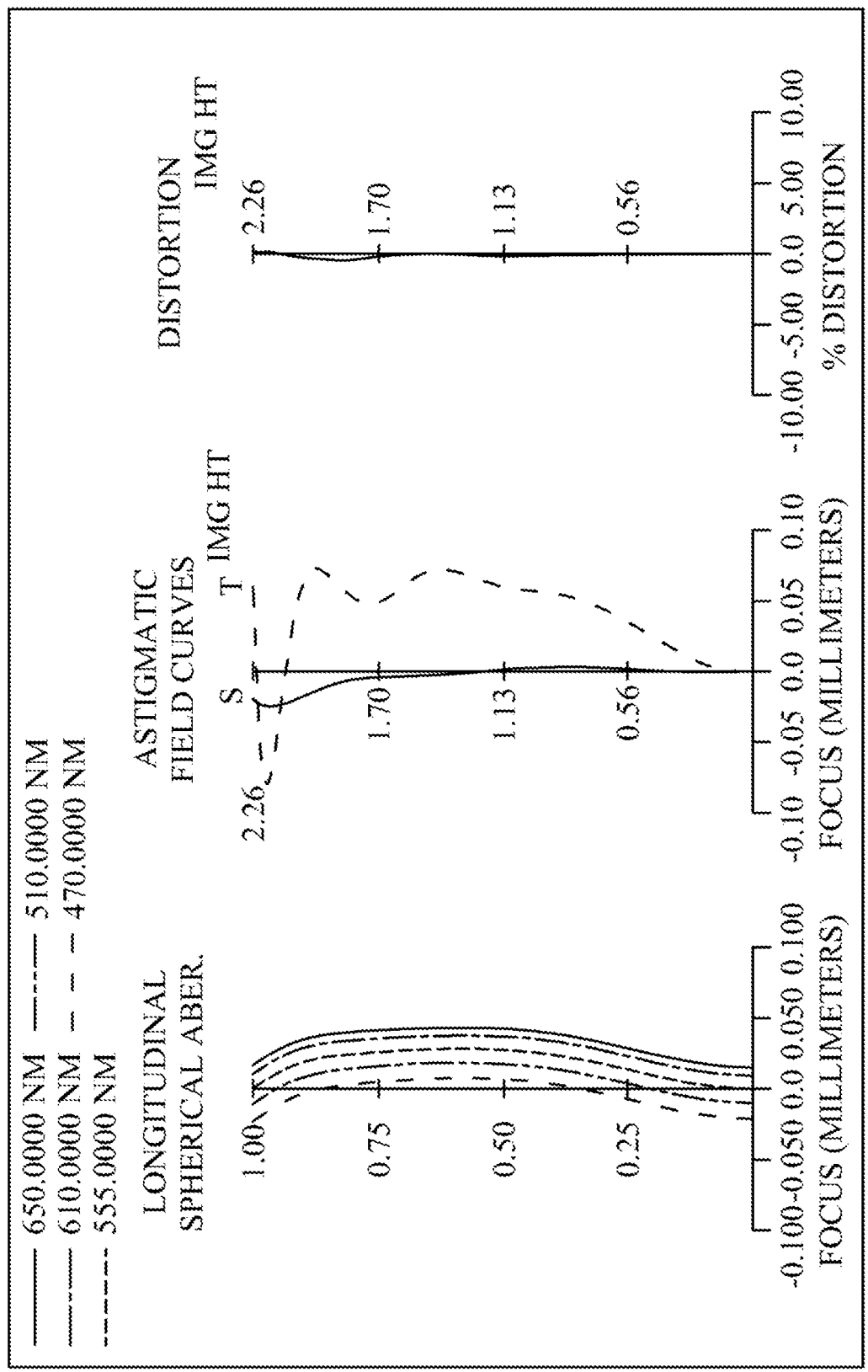
FIG. 5B shows the longitudinal spherical aberration curves, astigmatic field curves, and an optical distortion of the optical image capturing system in the order from left to right according to the fifth embodiment of the present invention.
Figure 5C:
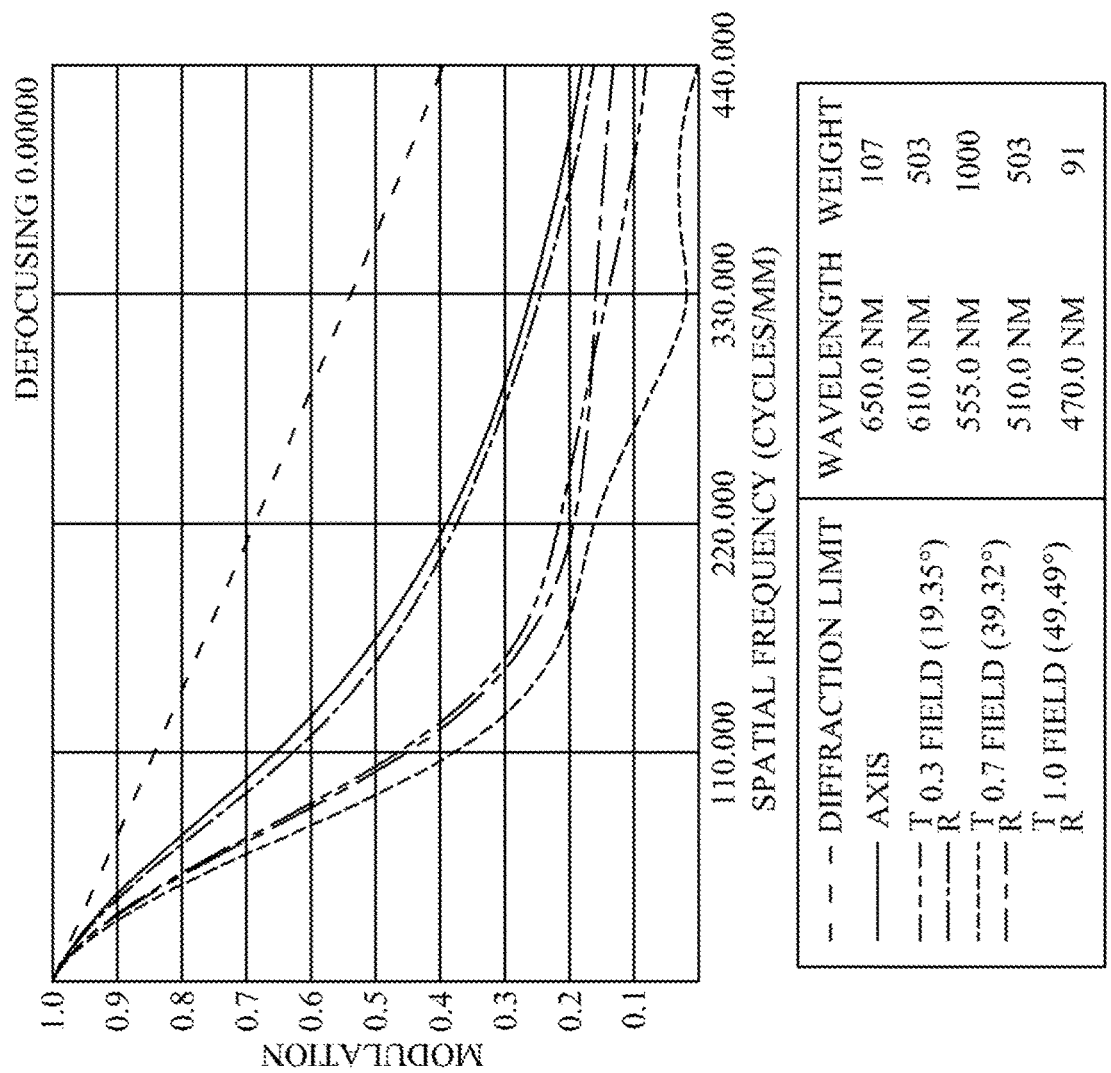
FIG. 5C is a characteristic diagram of modulation transfer of visible light spectrum for the optical image capturing system according to the fifth embodiment of the present invention.

Please refer to FIG. 5A to FIG. 5C. FIG. 5A is a schematic view of the optical image capturing system according to the fifth embodiment of the present invention. FIG. 5B shows the longitudinal spherical aberration curves, astigmatic field curves, and an optical distortion of the optical image capturing system in the order from left to right according to the fifth embodiment of the present invention. FIG. 5C is a characteristic diagram of modulation transfer of visible light spectrum for the optical image capturing system according to the fifth embodiment of the present invention.

As shown in FIG. 5A, in the order from an object side to an image side, the optical image capturing system 50 includes a first lens 510, an aperture 500, a second lens 520, a third lens 530, a fourth lens 540, an IR-bandstop filter 570, an image plane 580 and an image sensing device 590.

The first lens 510 has positive refractive power and is made of plastic. The object side 512 of the first lens 510 is a concave surface and the image side 514 of the first lens 510 is a convex surface, and the object side 512 and the image side 514 of the first lens 510 are aspheric. The object side 512 and the image side 514 of the first lens 510 both have one inflection point.

The second lens 520 has positive refractive power and is made of plastic. The object side 522 of the second lens 520 is a concave surface and the image side 524 of the second lens 520 is a convex surface, and the object side 522 and the image side 524 of the second lens 520 are both aspheric. The image side 524 of the second lens 520 has one inflection point.

The third lens 530 has positive refractive power and is made of plastic. The object side 532 of the third lens 530 is a concave surface and the image side 534 of the third lens 530 is a convex surface, and the object side 532 and the image side 534 of the third lens 530 are both aspheric. The image side 534 of the third lens 530 has two inflection points.

The fourth lens 540 has negative refractive power and is made of plastic. The object side 542 of the fourth lens 540 is a convex surface and the image side 544 of the fourth lens 540 is a concave surface, and the object side 542 and the image side 544 of the fourth lens 540 are both aspheric. The object side 542 and the image side 544 of the fourth lens 540 both have one inflection point.

The IR-bandstop filter 570 is made of glass and is disposed between the fourth lens 540 and the image plane 580 without affecting the focal length of the optical image capturing system 50.

Table 9 and Table 10 below should be incorporated into the reference of the present embodiment.

TABLE 9

Lens Parameters for the Fifth Embodiment
f (focal length) = 1.9206 mm; f/HEP = 2.0;
HAF (half angle of view) = 49.5 deg;

| Surface No. | | Curvature Radius | Thickness (mm) | Material |
|---|---|---|---|---|
| 0 | Object | 1E+18 | 1E+18 | |
| 1 | First Lens | −6.105334352 | 0.498 | Plastic |
| 2 | | −3.767861439 | 0.698 | |
| 3 | Aperture | 1E+18 | 0.175 | |
| 4 | Second Lens | −5.746865306 | 0.547 | Plastic |
| 5 | | −1.385639072 | 0.367 | |
| 6 | Third Lens | −1.099100114 | 0.723 | Plastic |
| 7 | | −0.694736745 | 0.050 | |
| 8 | Fourth Lens | 1.64403896 | 0.485 | Plastic |
| 9 | | 0.753855258 | 0.313 | |
| 10 | IR-bandstop filter | 1E+18 | 0.210 | BK_7 |
| 11 | | 1E+18 | 0.740 | |
| 12 | Image Plane | 1E+18 | 0.000 | |

| Surface No. | Refractive Index | Coefficient of Dispersion | Focal Length |
|---|---|---|---|
| 0 | | | |
| 1 | 1.636 | 23.879 | 13.258 |
| 2 | | | |
| 3 | | | |
| 4 | 1.545 | 55.938 | 3.084 |
| 5 | | | |
| 6 | 1.545 | 55.938 | 1.909 |
| 7 | | | |
| 8 | 1.661 | 20.391 | −2.642 |
| 9 | | | |
| 10 | 1.517 | 64.13 | |
| 11 | | | |
| 12 | | | |

Reference Wavelength = 555 nm. Shield Position: the 1st surface with effective radius = 1.988 mm; the 2nd surface with effective radius = 1.795 mm; the 4th surface with effective radius = 0.746 mm; the 6th surface with effective radius = 1.237 mm; the 8th surface with effective radius = 2.002 mm.

TABLE 10

The Aspheric Coefficients of the Fifth Embodiment
Table 10: Aspheric Coefficients

| Surface No. | 1 | 2 | 4 | 5 |
|---|---|---|---|---|
| k= | −4.212991E+01 | −3.134102E+01 | 3.679565E+01 | 1.167325E−01 |
| A4= | 5.214611E−02 | 4.365440E−02 | −1.773393E−01 | 1.029283E−01 |
| A6= | −2.806010E−02 | −3.101334E−02 | 7.409427E−01 | −1.214077E+00 |
| A8= | 1.212574E−02 | 1.610257E−02 | −7.707940E+00 | 8.541450E+00 |
| A10= | −3.731120E−03 | −5.843953E−03 | 4.196491E+01 | −3.455472E+01 |
| A12= | 6.872495E−04 | 1.320514E−03 | −1.357810E+02 | 7.758153E+01 |
| A14= | −5.249566E−05 | −1.279847E−04 | 1.783585E+02 | −9.204209E+01 |
| A16= | 0.000000E+00 | 0.000000E+00 | 0.000000E+00 | 4.406861E+01 |

| Surface No. | 6 | 7 | 8 | 9 |
|---|---|---|---|---|
| k= | −1.233947E−01 | −2.658046E+00 | −9.479655E−01 | −4.668038E+00 |
| A4= | 4.451173E−01 | −1.900094E−01 | −3.678069E−01 | −1.072075E−01 |
| A6= | −1.276507E+00 | −1.899034E−01 | 1.798565E−01 | 1.425226E−02 |
| A8= | 4.302273E+00 | 6.331570E−01 | −3.546899E−02 | 3.233950E−02 |

TABLE 10-continued

The Aspheric Coefficients of the Fifth Embodiment
Table 10: Aspheric Coefficients

| | | | |
|---|---|---|---|
| A10= | −8.099847E+00 | −7.864107E−01 | −4.382862E−02 | −3.529523E−02 |
| A12= | 9.497774E+00 | 5.856213E−01 | 3.491402E−02 | 1.526470E−02 |
| A14= | −6.389137E+00 | −1.774270E−01 | −9.280103E−03 | −3.091811E−03 |
| A16= | 1.842006E+00 | 0.000000E+00 | 8.355462E−04 | 2.426401E−04 |

In the fifth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.87 | 0.8 | 0.76 | 0.65 | 0.47 | 0.38 |
| ETP1 | ETP2 | ETP3 | ETP4 | ED12/ED23 | SED |
| 0.489 | 0.490 | 0.666 | 0.535 | 2.552 | 1.502 |
| ETP1/TP1 | ETP2/TP2 | ETP3/TP3 | ETP4/TP4 | ED23/ED34 | SETP |
| 0.982 | 0.897 | 0.922 | 1.103 | 1.264 | 2.181 |
| ETL | EBL | EIN | EIR | PIR | STP |
| 4.826 | 1.143 | 3.683 | 0.193 | 0.313 | 2.253 |
| EIN/ETL | SETP/EIN | EIR/PIR | EBL/BL | BL | SETP/STP |
| 0.763 | 0.592 | 0.618 | 0.9155 | 1.2485 | 0.968 |
| ED12 | ED23 | ED34 | ED12/IN12 | ED23/IN23 | ED34/IN34 |
| 0.883 | 0.346 | 0.274 | 1.011 | 0.943 | 5.474 |
| InRS41 | InRS42 | HVT41 | HVT42 | ODT % | TDT % |
| −0.01732 | 0.10074 | 0.97638 | 1.23713 | −0.46618 | 0.65912 |
| $\mid 1+f/f1\mid$ | $\mid 1+f/f2\mid$ | $\mid 1+f/f3\mid$ | $\mid 1+f/f4\mid$ | $\mid 1+f1/f2\mid$ | $\mid 1+f2/f3\mid$ |
| 0.14487 | 0.62270 | 1.00623 | 0.72707 | 4.29845 | 1.61591 |
| ΣPPR | ΣNPR | ΣPPR/\|ΣNPR\| | ΣPP | ΣNP | f1/ΣPP |
| 1.34977 | 1.15110 | 1.17260 | 0.44274 | 15.16641 | −5.96639 |
| f4/ΣNP | IN12/f | IN23/f | IN34/f | TP3/f | TP4/f |
| 0.87415 | 0.40931 | 0.15660 | 0.01784 | 0.36030 | 0.20274 |
| InTL | HOS | HOS/HOI | InS/HOS | InTL/HOS | ΣTP/InTL |
| 3.22188 | 4.47041 | 1.97456 | 0.74659 | 0.72071 | 0.65202 |
| (TP1 + IN12)/TP2 | (TP4 + IN34)/TP3 | TP1/TP2 | TP3/TP4 | IN23/(TP2 + IN23 + TP3) | |
| 2.03387 | 0.61222 | 0.71289 | 1.77713 | 0.18942 | |
| \|InRS41\|/TP4 | \|InRS42\|/TP4 | HVT42/HOI | HVT42/HOS | | |
| 0.0445 | 0.2587 | 0.5464 | 0.2767 | | |

The following values for the conditional expressions can be obtained from the data in Table 9 and Table 10.

Values Related to Inflection Point of Fifth Embodiment
(Primary Reference Wavelength = 555 nm)

| | | | |
|---|---|---|---|
| HIF111 | 0.5110 | HIF111/HOI | 0.2257 |
| HIF121 | 0.5929 | HIF121/HOI | 0.2619 |
| HIF221 | 0.7922 | HIF221/HOI | 0.3499 |
| HIF321 | 0.8609 | HIF321/HOI | 0.3803 |
| HIF322 | 1.0859 | HIF322/HOI | 0.4796 |
| HIF411 | 0.4895 | HIF411/HOI | 0.2162 |
| HIF421 | 0.4987 | HIF421/HOI | 0.2203 |
| SGI111 | −0.0244 | \|SGI111⊥+\|/(\|SGI111⊥+\| + TP1) | 0.0544 |
| SGI121 | −0.0440 | ⊥+SGI121\|/(⊥+SGI121\| + TP1) | 0.0939 |
| SGI221 | −0.2654 | ⊥+SGI221\|/(⊥+SGI221\| + TP2) | 0.3084 |
| SGI321 | −0.4773 | ⊥+SGI321\|/(⊥+SGI321\| + TP3) | 0.4082 |
| SGI322 | −0.6739 | ⊥+SGI322\|/(⊥+SGI322\| + TP3) | 0.4934 |
| SGI411 | 0.0743 | \|SGI411⊥+\|/(\|SGI411⊥+\| + TP4) | 0.1603 |
| SGI421 | 0.1309 | ⊥+SGI421\|/(⊥+SGI421\| + TP4) | 0.2516 |

Sixth Embodiment

Figure 6A:
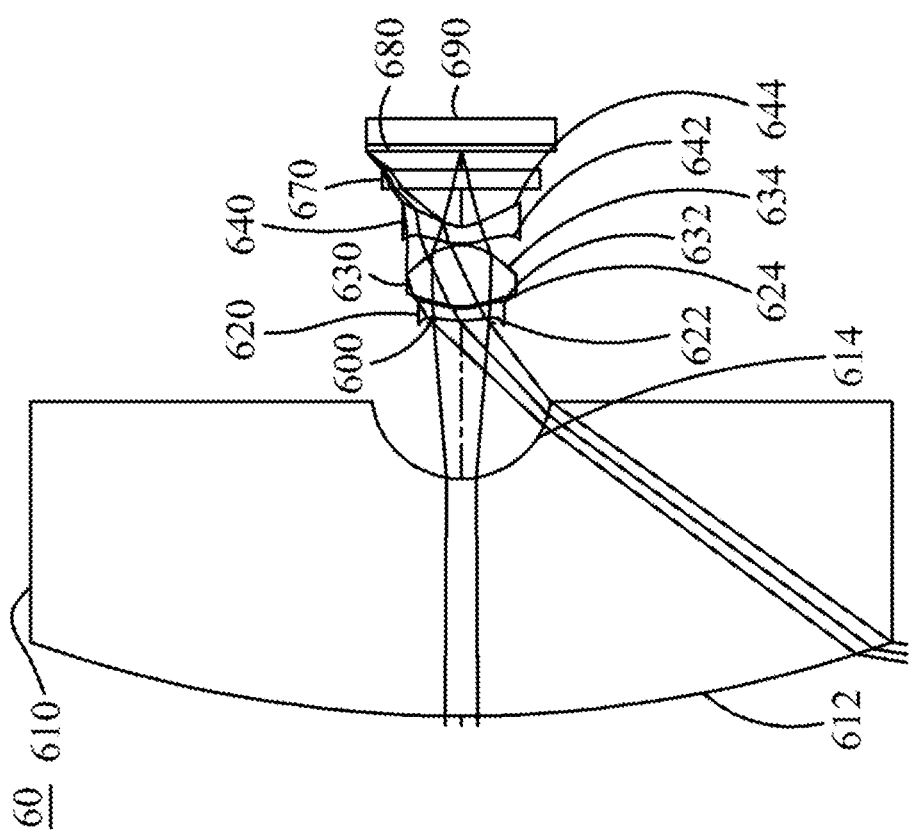
FIG. 6A is a schematic view of the optical image capturing system according to the sixth embodiment of the present invention.
Figure 6B:
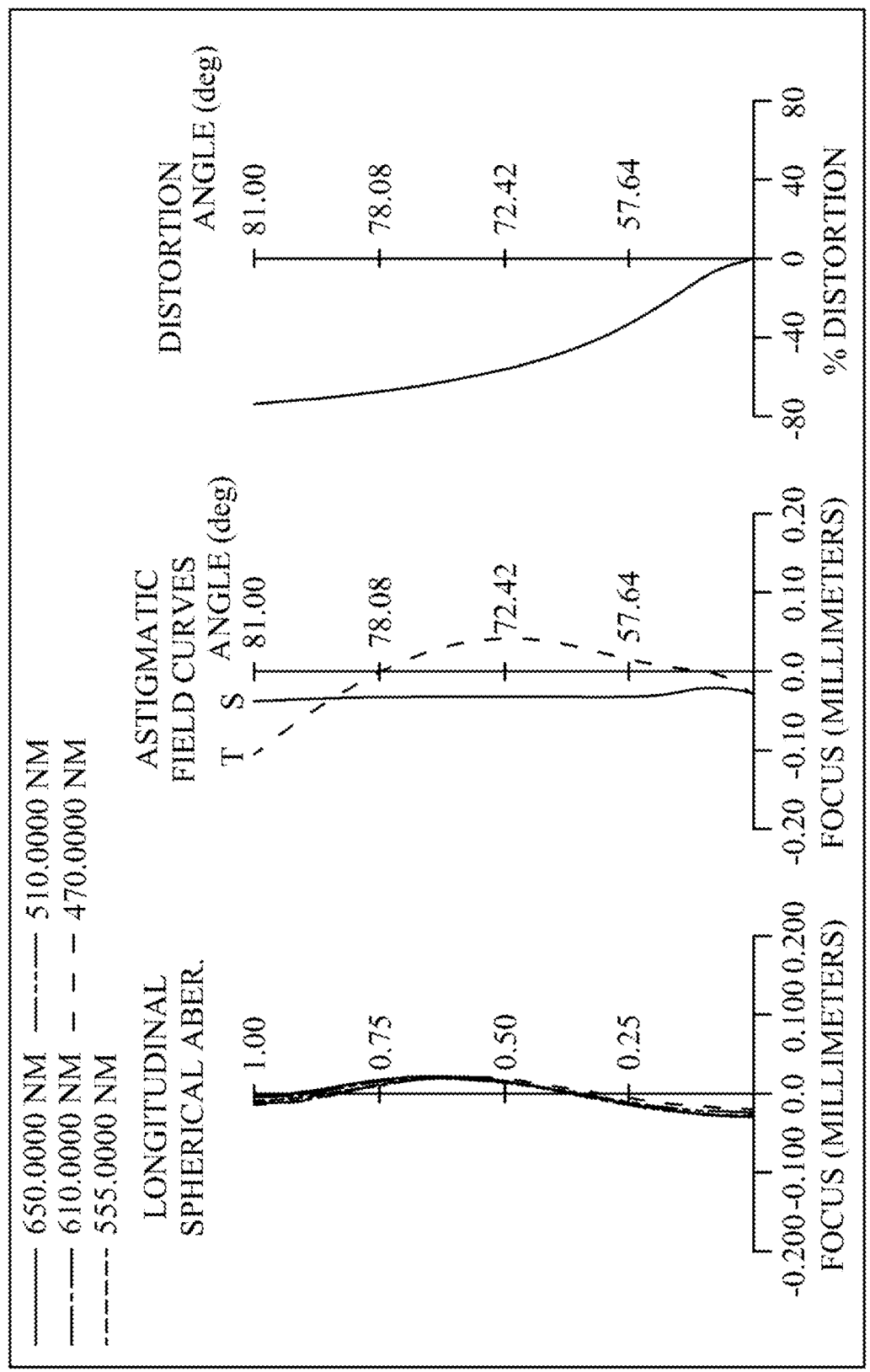
FIG. 6B shows the longitudinal spherical aberration curves, astigmatic field curves, and an optical distortion of the optical image capturing system in the order from left to right according to the sixth embodiment of the present invention.
Figure 6C:
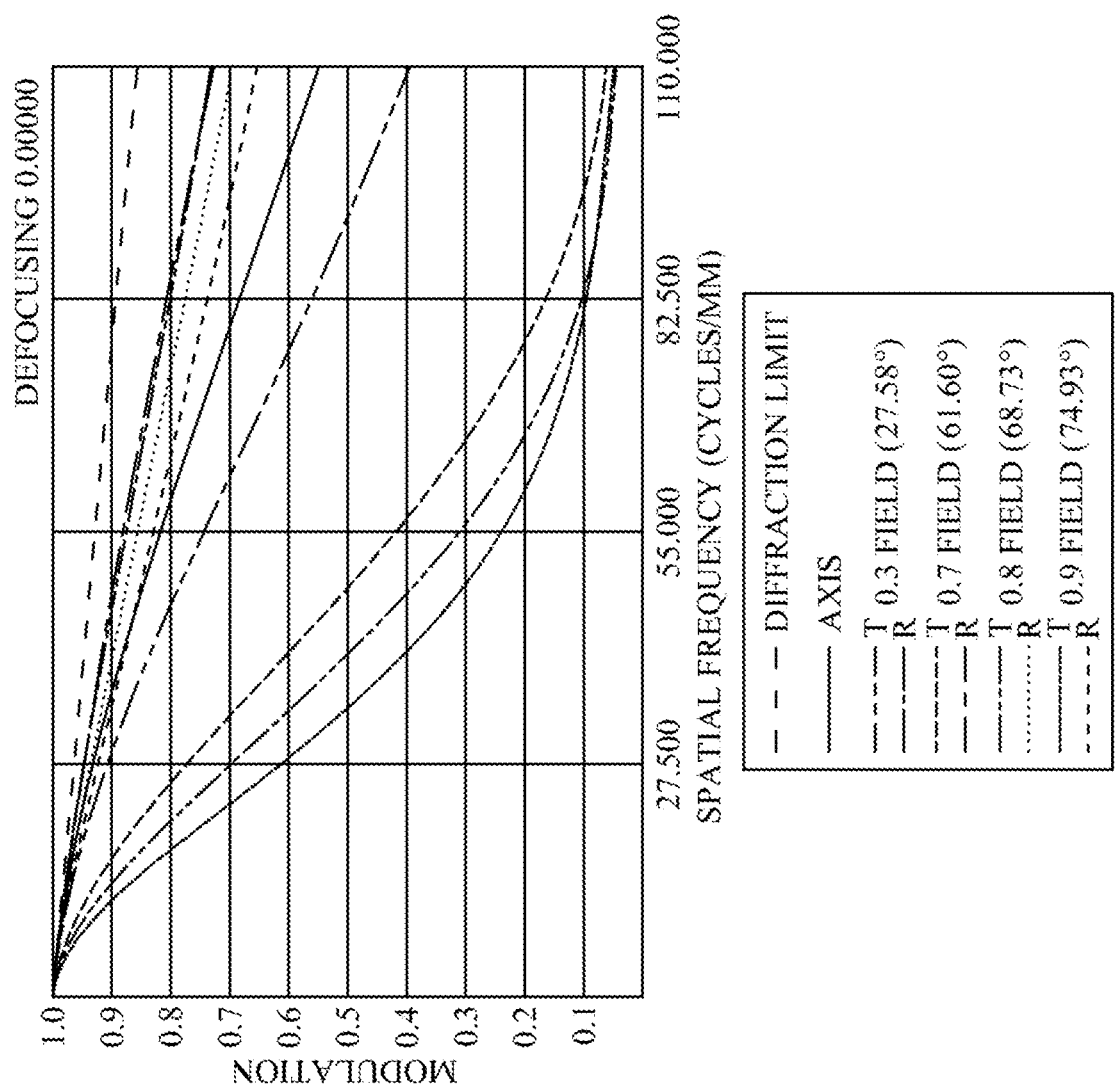
FIG. 6C is a characteristic diagram of modulation transfer of visible light spectrum for the optical image capturing system according to the sixth embodiment of the present invention.

Please refer to FIG. 6A to FIG. 6C. FIG. 6A is a schematic view of the optical image capturing system according to the sixth embodiment of the present invention. FIG. 6B shows the longitudinal spherical aberration curves, astigmatic field curves, and an optical distortion of the optical image capturing system in the order from left to right according to the sixth embodiment of the present invention. FIG. 6C is a characteristic diagram of modulation transfer of visible light spectrum for the optical image capturing system according to the sixth embodiment of the present invention.

As shown in FIG. 6A, in the order from an object side to an image side, the optical image capturing system 60 includes a first lens 610, an aperture 600, a second lens 620, a third lens 630, a fourth lens 640, an IR-bandstop filter 670, an image plane 680 and an image sensing device 690.

The first lens 610 has negative refractive power and is made of glass. The object side 612 of the first lens 610 is a convex surface and the image side 614 of the first lens 610 is a concave surface, and the object side 612 and the image side 614 of the first lens 610 are both aspheric.

The second lens 620 has negative refractive power and is made of plastic. The object side 622 of the second lens 620 is a convex surface and the image side 624 of the second lens 620 is a concave surface, and the object side 622 and the image side 624 of the second lens 620 are both aspheric. The object side 622 and the image side 624 of the first lens 620 both have one inflection point.

The third lens 630 has positive refractive power and is made of plastic. The object side 632 of the third lens 630 is a convex surface and the image side 634 of the third lens 630 is a convex surface, and the object side 632 and the image side 634 of the third lens 630 are both aspheric. The image side 634 of the third lens 630 has one inflection point.

The fourth lens 640 has negative refractive power and is made of plastic. The object side 642 of the fourth lens 640 is a convex surface and the image side 644 of the fourth lens 640 is a concave surface, and the object side 642 and the image side 644 of the fourth lens 640 are both aspheric. The object side 642 and the image side 644 of the fourth lens 640 both have one inflection point.

The IR-bandstop filter 670 is made of glass and is disposed between the fourth lens 640 and the image plane 680 without affecting the focal length of the optical image capturing system 60.

Table 11 and Table 12 below should be incorporated into the reference of the present embodiment.

TABLE 11

Lens Parameters for the Sixth Embodiment
f (focal length) = 1.5293 mm; f/HEP = 1.8;
HAF (half angle of view) = 80.0002 deg;

| Surface No. | | Curvature Radius | Thickness (mm) | Material |
|---|---|---|---|---|
| 0 | Object | 1E+18 | 1E+13 | |
| 1 | First Lens | 33.96670836 | 6.367 | Glass |
| 2 | | 2.384801492 | 4.168 | |
| 3 | Aperture | 1E+18 | 0.076 | |
| 4 | Second Lens | 2.437806097 | 0.328 | Plastic |
| 5 | | 1.406697788 | 0.050 | |
| 6 | Third Lens | 1.663286528 | 1.646 | Plastic |
| 7 | | −1.105852275 | 0.050 | |
| 8 | Fourth Lens | 1.86776692 | 0.457 | Plastic |
| 9 | | 0.962062686 | 1.000 | |
| 10 | IR-bandstop filter | 1E+18 | 0.500 | BK_7 |
| 11 | | 1E+18 | 0.475 | |
| 12 | Image Plane | 1E+18 | 0.029 | |

| Surface No. | Refractive Index | Coefficient of Dispersion | Focal Length |
|---|---|---|---|
| 0 | | | |
| 1 | 1.517 | 64.20 | −5.315 |
| 2 | | | |
| 3 | | | |
| 4 | 1.661 | 20.40 | −5.714 |
| 5 | | | |
| 6 | 1.565 | 58.00 | 1.493 |
| 7 | | | |
| 8 | 1.661 | 20.40 | −3.729 |
| 9 | | | |
| 10 | 1.517 | 64.13 | 1E+18 |
| 11 | | | |
| 12 | | | |

Reference wavelength = 555 nm

TABLE 12

The Aspheric Coefficients of the Sixth Embodiment
Table 12: Aspheric Coefficients

| Surface No. | 1 | 2 | 4 | 5 |
|---|---|---|---|---|
| k= | 0.000000E+00 | 0.000000E+00 | −8.107424E+00 | −5.480770E+00 |
| A4= | 0.000000E+00 | 0.000000E+00 | −1.013680E−01 | −1.151007E−01 |
| A6= | 0.000000E+00 | 0.000000E+00 | 3.249061E−02 | 8.615677E−02 |
| A8= | 0.000000E+00 | 0.000000E+00 | −1.772131E−03 | −5.622317E−02 |
| A10= | 0.000000E+00 | 0.000000E+00 | −6.173641E−02 | 5.188087E−03 |
| A12= | 0.000000E+00 | 0.000000E+00 | 0.000000E+00 | 0.000000E+00 |

TABLE 12-continued

The Aspheric Coefficients of the Sixth Embodiment
Table 12: Aspheric Coefficients

| Surface No. | 6 | 7 | 8 | 9 |
|---|---|---|---|---|
| k= | −6.602523E+00 | −4.587583E+00 | −4.838229E+00 | −4.146994E+00 |
| A4= | −4.167732E−02 | −1.378650E−01 | −2.442303E−02 | 3.739745E−02 |
| A6= | 3.884562E−02 | 7.494643E−02 | −9.757068E−03 | −3.904472E−02 |
| A8= | −2.013306E−02 | −3.735459E−02 | −2.541660E−03 | 1.347993E−02 |
| A10= | 4.567148E−03 | 8.758062E−03 | 3.780369E−04 | −1.642790E−03 |
| A12= | 0.000000E+00 | 0.000000E+00 | 0.000000E+00 | 0.000000E+00 |

In the sixth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 11 and Table 12:

| Sixth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.82 | 0.74 | 0.42 | 0.55 | 0.4 | 0.06 |
| ETP1 | ETP2 | ETP3 | ETP4 | ED12/ED23 | SED |
| 6.402 | 0.351 | 1.520 | 0.496 | 97.387 | 4.454 |
| ETP1/TP1 | ETP2/TP2 | ETP3/TP3 | ETP4/TP4 | ED23/ED34 | SETP |
| 1.006 | 1.071 | 0.923 | 1.084 | 0253 | 8.769 |
| ETL | EBL | EIN | EIR | PIR | STP |
| 15.143 | 1.920 | 13.223 | 0.916 | 1.000 | 8.798 |
| EIN/ETL | SETP/EIN | EIR/PIR | EBL/BL | BL | SETP/STP |
| 0.873 | 0.663 | 0.916 | 0.9583 | 2.0035 | 0.997 |
| ED12 | ED23 | ED34 | ED12/IN12 | ED23/IN23 | ED34/IN34 |
| 4.238 | 0.044 | 0.172 | 0.999 | 0.870 | 3.446 |
| InRS41 | InRS42 | HVT41 | HVT42 | ODT % | TDT % |
| 0.17333 | 0.61378 | 1.22584 | 0.00000 | −71.26940 | 42.76640 |
| $\lvert 1+f/f1 \rvert$ | $\lvert 1+f/f2 \rvert$ | $\lvert 1+f/f3 \rvert$ | $\lvert 1+f/f4 \rvert$ | $\lvert 1+f1/f2 \rvert$ | $\lvert 1+f2/f3 \rvert$ |
| 0.28776 | 0.26764 | 1.02436 | 0.41014 | 0.93009 | 3.82732 |
| ΣPPR | ΣNPR | ΣPPR/\|ΣNPR\| | ΣPP | ΣNP | f1/ΣPP |
| 1.70214 | 0.28776 | 5.91513 | −7.94997 | −5.31463 | 0.46904 |
| f4/ΣNP | IN12/f | IN23/f | IN34/f | TP3/f | TP4/f |
| 1.00000 | 2.77531 | 0.03269 | 0.03269 | 1.07629 | 0.29913 |
| InTL | HOS | HOS/HOI | InS/HOS | InTL/HOS | ΣTP/InTL |
| 13.14210 | 15.14560 | 6.05824 | 0.30443 | 0.86772 | 0.66943 |
| (TP1 + IN12)/TP2 | (TP4 + IN34)/TP3 | TP1/TP2 | TP3/TP4 | IN23/(TP2 + IN23 + TP3) | |
| 32.38477 | 0.30830 | 19.43086 | 3.59805 | 0.02471 | |
| \|InRS41\|/TP4 | \|InRS42\|/TP4 | HVT42/HOI | HVT42/HOS | | |
| 0.3789 | 1.3417 | 0.0000 | 0.0000 | | |

The following values for the conditional expressions can be obtained from the data in Table 11 and Table 12:

| Values Related to Inflection Point of Sixth Embodiment (Primary Reference Wavelength = 555 nm) | | | |
|---|---|---|---|
| HIF211 | 0.5071 | HIF211/HOI | 0.2028 |
| HIF221 | 0.5926 | HIF221/HOI | 0.2371 |
| HIF321 | 1.3115 | HIF321/HOI | 0.5246 |
| HIF411 | 0.7369 | HIF411/HOI | 0.2947 |
| HIF421 | 0.9959 | HIF421/HOI | 0.3983 |
| SGI211 | 0.0430 | \|SGI211⊥+/(\|SGI211⊥+ + TP2) | 0.1160 |
| SGI221 | 0.0954 | ⊥+SGI221\|/(⊥+SGI221\| + TP2) | 0.2255 |
| SGI321 | −0.6713 | ⊥+SGI321\|/(⊥+SGI321\| + TP3) | 0.2897 |
| SGI411 | 0.1194 | \|SGI411⊥+/(\|SGI411⊥+ + TP4) | 0.2070 |
| SGI421 | 0.3437 | ⊥+SGI421\|/(⊥+SGI421\| + TP4) | 0.4290 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens with refractive power;
   a second lens with positive refractive power;
   a third lens with refractive power;
   a fourth lens with refractive power; and
   an image plane;
   wherein the optical image capturing system comprises four lenses with refractive power, focal lengths of the four lenses are expressed as f1, f2, f3 and f4, respectively, a focal length of the optical image capturing system is expressed as f, and an entrance pupil diameter of the optical image capturing system is expressed as HEP, a distance on an optical axis from an object side of the first lens to the image plane is expressed as HOS, a distance on the optical axis from the object side of the first lens to an image side of the fourth lens is expressed as InTL, a half maximum angle of view of the optical image capturing system is expressed as HAF, thicknesses of the first lens to fourth lens at height of ½ HEP parallel to the optical axis are respectively expressed as ETP1, ETP2, ETP3 and ETP4, a sum of ETP1 to ETP4 described above is expressed as SETP, thicknesses of the first lens to fourth lens on the optical axis are respectively expressed as TP1, TP2, TP3 and TP4, a sum of TP1 to TP4 described above is expressed as ΣTP, conditions as follow are satisfied: 1.0≤f/HEP≤12.0,0 deg<HAF≤150 deg and 0.5≤SETP/ΣTP<1;
   wherein the optical image capturing system comprises a light filtering element, the light filtering element is located between the fourth lens and the image plane, a distance parallel to the optical axis from a second coordinate point on the image side of the fourth lens at height of ½ HEP to the light filtering element is expressed as EIR, a distance parallel to the optical axis from an intersection point where the image side of the fourth lens crosses the optical axis to the light filtering element is expressed as PIR, and the condition as follows is satisfied: 0.1≤EIR/PIR≤1.1;
   wherein the entrance pupil diameter HEP is smaller than or substantially equal to diameters of the first lens, the second lens, the third lens and the fourth lens.

2. The optical image capturing system of claim 1, wherein a distance on the optical axis between the first lens and the second lens is expressed as IN12, a distance on the optical axis between the second lens and the third lens is expressed as IN23, a distance on the optical axis between the third lens and the fourth lens is expressed as IN34, the following condition is satisfied: IN12>IN23>IN34.

3. The optical image capturing system of claim 1, wherein the fourth lens has negative refractive power.

4. The optical image capturing system of claim 1, wherein modulation transfer rates of visible light at spatial frequency of 55 cycles/mm at positions of the optical axis, 0.3 HOI and 0.7 HOI on the image plane are respectively expressed as MTFE0, MTFE3 and MTFE7, and conditions as follow are satisfied: MTFE0≥0.2, MTFE3≥0.01, and MTFE7≥0.01.

5. The optical image capturing system of claim 1, wherein a horizontal distance parallel to the optical axis from a first coordinate point on the object side of the first lens at height of ½ HEP to the image plane is expressed as ETL, a horizontal distance parallel to the optical axis from the first coordinate point on the object side of the first lens at height of ½ HEP to a second coordinate point on the image side of the fourth lens at height of ½ HEP is expressed as EIN, and the condition as follows is satisfied: 0.2≤EIN/ETL<1.

6. The optical image capturing system of claim 1, wherein the thickness parallel to the optical axis of the first lens at height of ½ HEP is expressed as ETP1, the thickness parallel to the optical axis of the second lens at height of ½ HEP is expressed as ETP2, the thickness parallel to the optical axis of the third lens at height of ½ HEP is expressed as ETP3, the thickness parallel to the optical axis of the fourth lens at height of ½ HEP is expressed as ETP4, the sum of ETP1 through ETP4 described above is expressed as SETP, a horizontal distance parallel to the optical axis from a first coordinate point on the object side of the first lens at height of ½ HEP to a second coordinate point on the image side of the fourth lens at height of ½ HEP is expressed as EIN, and the condition as follows is satisfied: 0.3≤SETP/EIN≤1.

7. The optical image capturing system of claim 1, wherein a horizontal distance parallel to the optical axis from a third coordinate point on the image side of the third lens at height of ½ HEP to the image plane is expressed as EBL, a horizontal distance parallel to the optical axis from an intersection point where the image side of the fourth lens crosses the optical axis to the image plane is expressed as BL, and the condition as follows are satisfied: 0.1≤EBL/BL≤1.5.

8. The optical image capturing system of claim 1, further comprising an aperture, wherein a distance on the optical axis from the aperture to the image plane is expressed as InS, and the condition as follows is satisfied: 0.2≤InS/HOS≤1.1.

9. An optical image capturing system, from an object side to an image side, comprising:
   a first lens with refractive power;
   a second lens with positive refractive power;

a third lens with refractive power;
a fourth lens with negative refractive power; and
an image plane;
wherein the optical image capturing system comprises four lenses with refractive power, at least one lens of the first lens to the fourth lens has at least one inflection point on at least one surface thereof, focal lengths of the four lenses are respectively expressed as f1, f2, f3 and f4, a focal length of the optical image capturing system is expressed as f, an entrance pupil diameter of the optical image capturing system is expressed as HEP, a distance on an optical axis from an object side of the first lens to the image plane is expressed as HOS, a distance on the optical axis from the object side of the first lens to an image side of the fourth lens is expressed as InTL, a half maximum angle of view of the optical image capturing system is expressed as HAF, a horizontal distance parallel to the optical axis from a first coordinate point on the object side of the first lens at height of ½ HEP to the image plane is expressed as ETL, a horizontal distance parallel to the optical axis from the first coordinate point on the object side of the first lens at height of ½ HEP to a second coordinate point on the image side of the fourth lens at height of ½ HEP is expressed as EIN, and conditions as follow are satisfied: 1.0≤f/HEP≤10.0, 0 deg<HAF≤150 deg and 0.2≤EIN/ETL<1;
wherein the object side of the first lens on the optical axis is a concave surface and the image side of the first lens on the optical axis is a convex surface;
wherein the entrance pupil diameter HEP is smaller than or substantially equal to diameters of the first lens, the second lens, the third lens and the fourth lens.

10. The optical image capturing system of claim 9, wherein a thickness of the third lens on the optical axis is expressed as TP3, a thickness of the fourth lens on the optical axis is expressed as TP4 and the condition as follows is satisfied: TP3>TP4.

11. The optical image capturing system of claim 9, wherein a horizontal distance parallel to the optical axis from a third coordinate point on an image side of the third lens at height of ½ HEP to a fourth coordinate point on an object side of the fourth lens at height of ½ HEP is expressed as ED34; a distance between the third lens and the fourth lens on the optical axis is expressed as IN34 and the condition as follows is satisfied: 0<ED34/IN34≤50.

12. The optical image capturing system of claim 9, wherein a horizontal distance parallel to the optical axis from a fifth coordinate point on an image side of the first lens at height of ½ HEP to a sixth coordinate point on an object side of the second lens at height of ½ HEP is expressed as ED12, a distance between the first lens and the second lens on the optical axis is expressed as IN12 and the condition as follows is satisfied: 0<ED12/IN12≤35.

13. The optical image capturing system of claim 9, wherein a thickness of the second lens at height of ½ HEP parallel to the optical axis is expressed as ETP2, a thickness of the second lens on the optical axis is expressed as TP2, which satisfies the condition as follows: 0.1≤ETP2/TP2≤5.

14. The optical image capturing system of claim 9, wherein a thickness of the third lens at height of ½ HEP parallel to the optical axis is expressed as ETP3, a thickness of the third lens on the optical axis is expressed as TP3, which satisfies the condition as follows: 0.1≤ETP3/TP3≤5.

15. The optical image capturing system of claim 9, wherein a thickness of the fourth lens at height of ½ HEP parallel to the optical axis is expressed as ETP4, a thickness of the fourth lens on the optical axis is expressed as TP4, which satisfies condition as follows: 0.1≤ETP4/TP4≤5.

16. The optical image capturing system of claim 9, wherein modulation transfer rates of visible light at spatial frequency of 110 cycles/mm at positions of the optical axis, 0.3 HOI and 0.7 HOI on the image plane are respectively expressed as MTFQ0, MTFQ3 and MTFQ7, and conditions as follows are satisfied: MTFQ0≥0.2, MTFQ3≥0.01 and MTFQ7≥0.01.

17. The optical image capturing system of claim 9, wherein at least one lens among the first lens, the second lens, the third lens and the fourth lens is a filter element of light with wavelength of less than 500 nm.

18. An optical image capturing system, from an object side to an image side, comprising:
a first lens with refractive power;
a second lens with positive refractive power;
a third lens with positive refractive power;
a fourth lens with negative refractive power; and
an image plane;
wherein the optical image capturing system comprises four lenses with refractive power, at least one lens among the first lens to the fourth lens has at least one inflection point on at least one surface thereof, focal lengths of the first lens to the fourth lens are respectively expressed as f1, f2, f3 and f4, a focal length of the optical image capturing system is expressed as f, an entrance pupil diameter of the optical image capturing system is expressed as HEP; a distance on an optical axis from an object side of the first lens to the image plane is expressed as HOS, a distance on the optical axis from the object side of the first lens to an image side of the fourth lens is expressed as InTL, a half maximum angle of view of the optical image capturing system is expressed as HAF, a horizontal distance parallel to the optical axis from a first coordinate point on the object side of the first lens at height of ½ HEP to the image plane is expressed as ETL, a horizontal distance parallel to the optical axis from the first coordinate point on the object side of the first lens at height of ½HEP to a second coordinate point on the image side of the fourth lens at height of ½HEP is expressed as EIN, and conditions as follow are satisfied: 1.0≤f/HEP≤10.0, 0 deg<HAF≤100 deg and 0.2≤EIN/ETL<1;
wherein the object side of the first lens on the optical axis is a concave surface and the image side of the first lens on the optical axis is a convex surface;
wherein the entrance pupil diameter HEP is smaller than or substantially equal to diameters of the first lens, the second lens, the third lens and the fourth lens.

19. The optical image capturing system of claim 18, wherein a distance on the optical axis between the first lens and the second lens is expressed as IN12, a distance on the optical axis between the second lens and the third lens is expressed as IN23, a distance on the optical axis between the third lens and the fourth lens is expressed as IN34, the following condition is satisfied: IN12>IN23>IN34.

20. The optical image capturing system of claim 18, wherein a thickness of the third lens on the optical axis is expressed as TP3, a thickness of the fourth lens on the optical axis is expressed as TP4 and a following condition is satisfied: TP3>TP4.

21. The optical image capturing system of claim 18, wherein an image side of the third lens is a convex surface.

22. The optical image capturing system of claim 18, wherein a distance between the third lens and the fourth lens on the optical axis is expressed as IN34 and the condition as follows is satisfied: $0<IN34/f\leq5$.

23. The optical image capturing system of claim 21, further comprising an aperture, an image sensing device and a driving module, wherein the image sensing device is disposed on the image plane, a distance on the optical axis from the aperture to the image plane is expressed as InS, the driving module couples with the four lenses and enables movements of those lenses, and the condition as follows is satisfied: $0.2\leq InS/HOS\leq1.1$.

* * * * *